(12) United States Patent
Cavaliere et al.

(10) Patent No.: US 11,811,455 B2
(45) Date of Patent: Nov. 7, 2023

(54) DEVICE AND METHOD FOR PROCESSING AN OPTICAL SIGNAL

(71) Applicant: Telefonaktiebolaget LM Ericsson (publ), Stockholm (SE)

(72) Inventors: Fabio Cavaliere, Pisa (IT); Francesco Testa, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 421 days.

(21) Appl. No.: 16/770,665

(22) PCT Filed: Dec. 13, 2017

(86) PCT No.: PCT/EP2017/082582
§ 371 (c)(1),
(2) Date: Jun. 8, 2020

(87) PCT Pub. No.: WO2019/114942
PCT Pub. Date: Jun. 20, 2019

(65) Prior Publication Data
US 2021/0175972 A1 Jun. 10, 2021

(51) Int. Cl.
*H04B 10/297* (2013.01)
*H04J 14/02* (2006.01)
*H04Q 11/00* (2006.01)

(52) U.S. Cl.
CPC ...... *H04B 10/2971* (2013.01); *H04J 14/0216* (2013.01); *H04Q 11/0005* (2013.01)

(58) Field of Classification Search
CPC ............. H04B 10/2971; H04J 14/0216; H04Q 11/0005

(Continued)

(56) References Cited

U.S. PATENT DOCUMENTS

| 10,026,723 | B2 * | 7/2018 | Evans | H01L 24/49 |
| 11,211,775 | B2 * | 12/2021 | Foursa | H01S 5/50 |

(Continued)

FOREIGN PATENT DOCUMENTS

| CN | 107193171 A | * | 9/2017 | ............. G02F 1/395 |
| CN | 107395316 A | * | 11/2017 | ............. G02B 6/124 |

(Continued)

OTHER PUBLICATIONS

Paola Iovanna et al., "Future Proof Optical Network Infrastructure for 5G Transport" Opt. comm Netw vol. 8, Dec. 2016 (Year: 2016).*

(Continued)

*Primary Examiner* — Abbas H Alagheband
(74) *Attorney, Agent, or Firm* — Christopher & Weisberg, P.A.

(57) ABSTRACT

Device and method for processing an optical signal. The device includes a photonic device arranged between a first input/output and second input/output and optically communicating with the inputs/outputs by a signal path for transmission of an optical signal in a first or second direction between the first input/output and second input/output. The device includes an optical gain element for amplifying the optical signal. The device includes a path switching circuit including a first signal amplification path connectable between the first input/output and the photonic device for optically coupling the signal path to and from the optical gain element, and a second signal amplification path connectable between the photonic device and the second input/output for optically coupling the signal path to and from the optical gain element. The path switching circuit selectively connects the first or second signal amplification path into the signal path.

22 Claims, 16 Drawing Sheets

(58) Field of Classification Search
USPC .......................................................... 359/341
See application file for complete search history.

(56) References Cited

U.S. PATENT DOCUMENTS

| | | | |
|---|---|---|---|
| 2005/0141894 A1* | 6/2005 | Kim | H04J 14/0241 398/83 |
| 2008/0138068 A1* | 6/2008 | Akiyama | H04J 14/0217 398/50 |
| 2013/0083389 A1* | 4/2013 | Dakin | G01S 17/58 359/341.1 |
| 2017/0195064 A1* | 7/2017 | Chang | H01S 5/0625 |
| 2021/0175972 A1* | 6/2021 | Cavaliere | H04B 10/2971 |
| 2021/0384709 A1* | 12/2021 | Takabayashi | H01S 5/4068 |
| 2021/0409847 A1* | 12/2021 | Hinderthür | H04J 14/0212 |

FOREIGN PATENT DOCUMENTS

| | | | | |
|---|---|---|---|---|
| EP | 1235370 | A2 | 8/2002 | |
| EP | 1427122 | A2 | 6/2004 | |
| EP | 1427122 | A2 * | 6/2004 | .......... H04J 14/0208 |
| EP | 1429486 | A2 | 6/2004 | |
| EP | 1235370 | A3 | 7/2004 | |
| EP | 1427122 | B1 * | 1/2008 | .......... H04J 14/0208 |
| EP | 2878089 | B1 * | 10/2018 | ......... H04B 10/2971 |
| JP | S59215134 | A | 12/1984 | |
| JP | 3943537 | B2 * | 7/2007 | ......... H04B 10/2971 |
| JP | 2014127796 | A * | 7/2014 | |
| WO | WO-2013182246 | A1 * | 12/2013 | .......... H04J 14/0212 |

OTHER PUBLICATIONS

Heck, Martijn J.R., et al., "Hybrid Silicon Photonic Integrated Circuit Technology", IEEE Journal of Selected Topics in Quantum Electronics, vol. 19, No. 4, Jul.-Aug. 2013, pp. 1-17.

Iovanna, Paola, et al., "Future Proof Optical Network Infrastructure for 5G Transport", J. Opt. Commun. Netw./vol. 8, No. 12, Dec. 2016, pp. 80-92.

EPO Communication dated Jun. 13, 2023 for Patent Application No. 17826165.7, consisting of 10-pages.

* cited by examiner

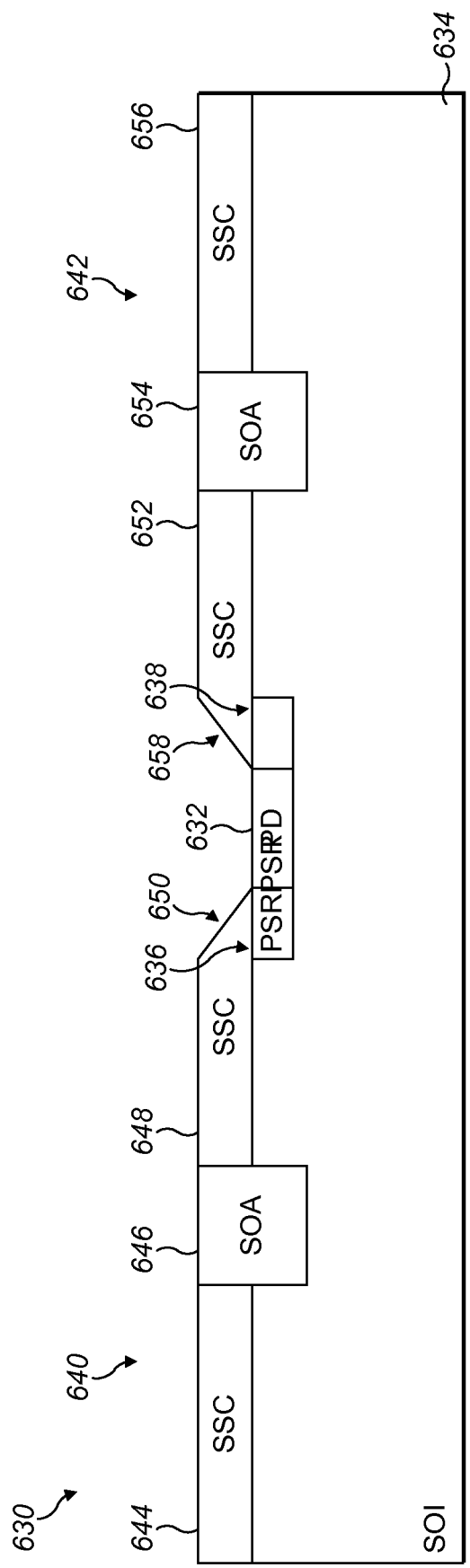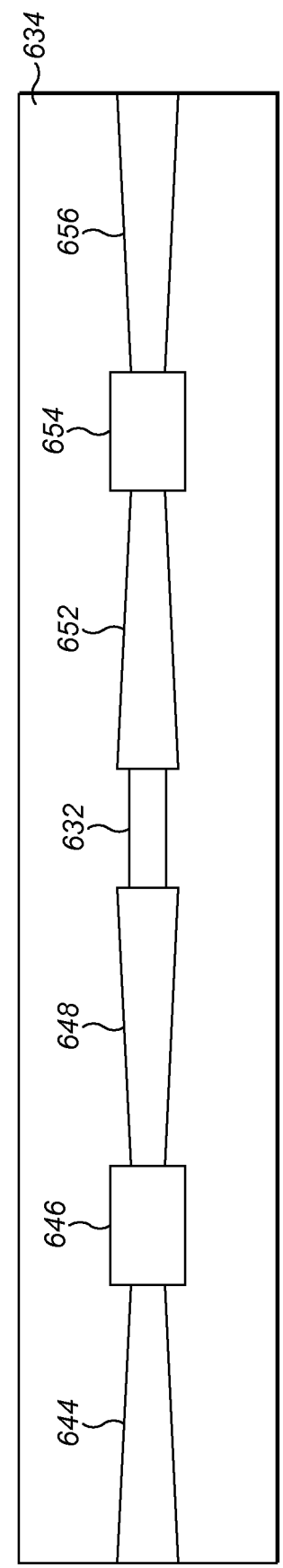
FIG. 15A
FIG. 15B

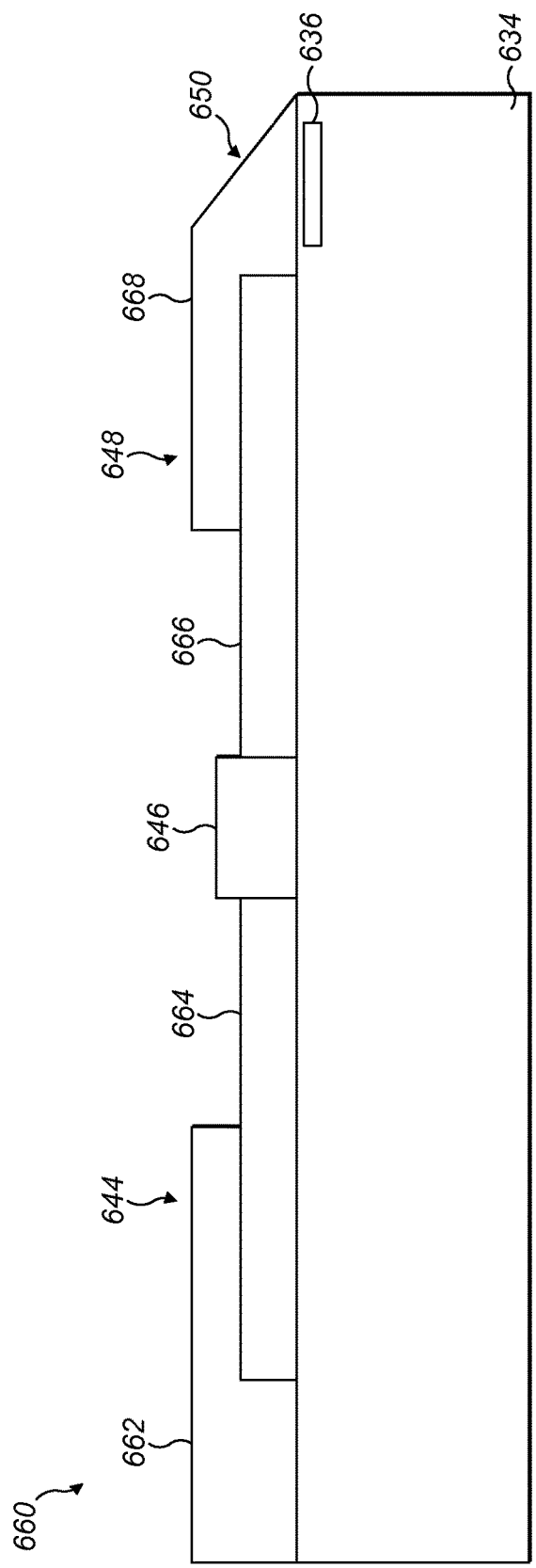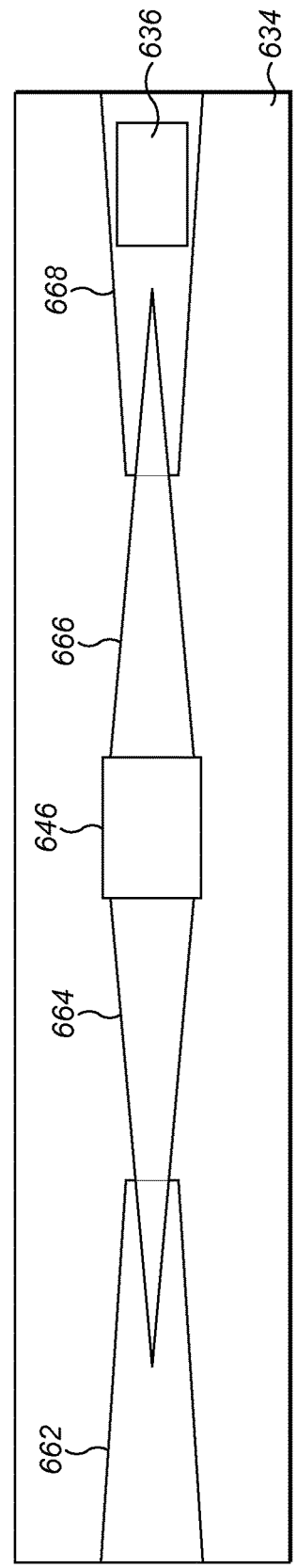

DEVICE AND METHOD FOR PROCESSING AN OPTICAL SIGNAL

TECHNICAL FIELD

The present disclosure relates to a device and method for processing an optical signal. In particular, the disclosure relates to an integrated optical device and a method for providing optical signal gain in an integrated optical device.

BACKGROUND

Telecommunication networks continue to evolve. 5$^{th}$ Generation (5G) networks are expected to bring about a major telecommunications transformation, providing an end-to-end infrastructure which is capable of providing a consistently high user quality of experience across heterogeneous network environments and for a wide range of use cases. Depending on the particular use case, performance demands may require high throughput, low latency, high reliability, high connectivity density, and/or high mobility range. To facilitate such a transformation, the underlying physical and logical telecommunications network infrastructure is subject to continuing development.

One part of the telecommunications network infrastructure is an optical transport network. An optical transport network includes one or more optical network elements which are typically interconnected by fiber optic cables and which are configured to provide specific functions, such as transport, multiplexing, switching, management, and resilience of optical channels carrying optical data signals.

One of the considerations associated with optical networks is the degradation of the optical signal during transmission, in particular from signal attenuation as the optical signal passes along a fiber optic cable or from insertion loss (loss of optical power) as an optical signal passes through, or is processed by, an optical network element. The performance and/or range of an optical network may be improved by providing optical amplification to the signal.

Another consideration is the ongoing drive to provide devices with higher throughput for a given footprint at a given cost. Photonic integrated circuits (PICs) may offer device miniaturization and performance capabilities consistent with this aim. A PIC may integrate into its circuit/sub-circuit multiple photonic functions or elements, including waveguides, filters, splitters, spot-size converters, polarization splitters/rotators, optical switches, variable optical attenuators, optical amplifiers, modulators, and photodiodes, among others. Waveguides, filters, splitters, spot-size converters, and polarization splitters/rotators, for example, may be considered to be passive elements; while optical amplifiers, modulators, and photodiodes, for example, may be considered to be active elements, having an intended dynamic interaction between the active element and light.

A PIC may be fabricated based on a range of different material platforms, including lithium niobate (LiNbO$_3$); silica on silicon (as planar lightwave circuits, or PLCs); silicon on insulator (SOI; also known as silicon photonics); and III-V semiconductors, such as gallium arsenide (GaAs) and indium phosphide (InP). Each material platform offers a respective set of advantages and constraints, so the selection of one material platform over another typically depends on the desired function of the PIC. Silicon photonics is of particular interest, however, as silicon photonic devices may be fabricated using complementary metal-oxide semiconductor (CMOS) manufacturing technology, which offers the possibility of high-volume and cost-effective manufacturing processes for SOI PICs.

A silicon-on-insulator wafer may be fabricated as follows. A single crystal ingot, or boule, of silicon is sliced into wafers, typically around 150-300 mm in diameter. Two wafer surfaces are oxidized, typically by dry or wet thermal oxidation techniques, to form a layer of silicon dioxide (SiO$_2$) on each wafer. One of the wafers is then implanted with hydrogen atoms to a specified depth. The wafer is placed on top of the other wafer to form a stack, with the oxide layers facing each other to bond the oxide layers together. The stack is baked in a vacuum, which results in the stack splitting or cracking at the hydrogen implant line and the oxide layers fully bonding together. The top surface is polished by chemical mechanical polishing, to provide a relatively thin layer of crystalline silicon (the device layer), on a layer of silicon dioxide (the buried oxide layer), on a bulk silicon support wafer (the handle layer). Other fabrication techniques may alternatively be used, including bonded and etchback processing or separation by implantation of oxygen.

Optical networks in telecommunications generally employ wavelengths of around 1.3 µm for datacom services and around 1.55 µm for telecom services, but other wavelengths, for example from the 1.26-1.68 µm range, may be used. Silicon is an indirect bandgap semiconductor, with a bandgap of 1.12 eV, so is transparent for light having wavelengths above 1.1 µm. Silicon is therefore generally not capable of generating or detecting light at telecommunications wavelengths, but is an attractive material for use as an optical waveguide, for switching, for spot-size conversion, for optical modulation, or for polarization splitting/rotation, among others. This is particularly so because of the relatively high refractive index contrast possible between silicon (n=3.48) and other materials, such as SiO$_2$ (n=1.45), which allows for strongly confining optical waveguide structures. However, silicon waveguide structures exhibit a large polarization dependent dispersion or loss for orthogonal, transverse electric (TE) and transverse magnetic (TM), components, which can increase complexity when coupling to a polarization-insensitive platform, such as optical fiber networks.

In order to provide light generation or optical amplification, then, other materials, such as group III-V materials, including InP or GaAs, may be integrated onto a silicon photonic chip. Providing optical amplification on a silicon photonic chip may compensate for or reduce the insertion loss for the chip, and allow the integration of multiple photonic circuits with many different functionalities on the chip, which may otherwise take up several optical processing cards of a telecommunications equipment shelf in existing implementations, such as line cards (for transmission), switching cards, or optical monitoring cards, among others.

A number of approaches for integrating active devices, such as optical amplification or gain devices, with silicon photonic devices is in principle possible, but there is as yet no clearly favored, stand-out approach. Monolithic integration techniques may include the use of epitaxially grown germanium as an optical gain medium; erbium-doped glass waveguides, such as aluminium oxide (Al$_2$O$_3$), which require optical pumping; or epitaxially grown GaAs quantum dots. Wafer-to-wafer assembly techniques may include the bonding of a III-V gain region, such as layers of InP and indium gallium arsenide phosphide (InGaAsP), to a SOI wafer by oxide bonding, for example, using an Al$_2$O$_3$ bonding interface; or by organic bonding, for example, using benzocyclobutene (BCB). Die-to-wafer assembly may include inserting a III-V die into a cavity in the SOI wafer and then patterning the waveguides. These techniques have the advantage that the full device may be integrated at the wafer level and tested before being diced out. The integration at wafer level may use standard fabrication equipment used in microelectronic packaging and does not require active alignment of dies with special flip-chip machines, which is not the case for die-to-die assembly.

Die-to-die assembly techniques may include butt coupling of a SOI die and a III-V die; or coupling a SOI die and a III-V die using a lens and a grating coupler. In the latter technique, flip-chip integration involves micro-packed semiconductor optical amplifier (SOA) assemblies being individually actively aligned, using an optical signal, with a respective silicon grating coupler by a flip-chip bonder. The alignment and flip-chip bonding steps complicate the fabrication process and add to the manufacturing costs.

FIG. 1 schematically shows an example of an integrated optical device which includes a SOI PIC in which InP SOAs are used to compensate for internal losses in the PIC. The integrated optical device is a reconfigurable optical add/drop multiplexer (ROADM) 100. This device is discussed in Iovanna et al.: "A Future Proof Optical Network Infrastructure for 5G Transport," IEEE, OSA Journal of Optical Communications and Networking, vol. 8, issue 12, December 2016.

The device may be configured in a double ring network with one ring transmitting downlink signals from a hub to remote nodes, and the other ring transmitting upstream signals from the remote nodes to the hub, in an optical network based on wavelength division multiplexing (WDM), in particular dense wavelength division multiplexing (DWDM), technology. The ROADM 100 may be used in the front haul of a wireless communications network, for reconfigurable add-drop of selected local channels at a remote radio unit (RRU), or remote node, site. The ROADM 100 may also be used in the back haul of a wireless communications network.

The ROADM 100 is formed of two independent circuit structures: a drop circuit structure 102 for locally dropping, or removing or exiting, DWDM channels from the optical network; and an add circuit structure 104 for locally adding DWDM channels to the optical network.

Referring firstly to the drop circuit structure 102, the structure is coupled at a first input/output end 106 to a first optical fiber 108 and is coupled at a second input/output end 110 to a second optical fiber 112. Optical signals may be transmitted in a first direction from the first optical fiber 108 to the first input/output end 106, through the drop circuit structure 102, and pass out of the second input/output end 110 to the second optical fiber 112. Alternatively, depending on configuration, network requirements, or operational status, optical signals may be transmitted in a second, reverse direction from the second optical fiber 112 to the second input/output end 110, through the drop circuit structure 102, and pass out of the first input/output end 106 to the first optical fiber 108. The first input/output end 106 may be referred to as a first input/output port or a west line port, and the second input/output end 110 may be referred to as a second input/output port or an east line port, although it should be noted that no strict geographical correspondence is intended.

Because of the strong polarization sensitivity of silicon wire waveguides, a polarization diversity scheme is used to provide a dual polarization structure. The drop circuit structure 102 is divided into a first drop sub-circuit 114 and a second drop sub-circuit 116. A first polarization splitter-rotator (PSR) in the form of a dual polarization grating coupler (DPGC) 118 is provided at the first input/output end 106. The first DPGC 118 splits the unknown and random polarization of input optical signals from the first optical fiber 108 into two orthogonal polarization components, namely TE and TM components. The DPGC 118 then rotates one of the components by 90° so that both components have the same polarization at the output of the DPGC. One component is output to the first drop sub-circuit 114 and the other component is output to the second drop sub-circuit 116, with the polarizations of both components now corresponding to the linear polarization mode of the silicon wire waveguide structures of the sub-circuits. From there, the two component optical signals may be processed identically, in parallel, along the first and second drop sub-circuits 114, 116, respectively. At the second input/output end 110, a second polarization splitter-rotator (PSR) in the form of a dual polarization grating coupler (DPGC) 120 is provided. The processed component optical signals are output from the first and second drop sub-circuits 114, 116 to the second DPGC 120. The second DPGC 120 performs the reverse procedure on the component optical signals, rotating the polarization of one of the components and recombining the components into output optical signals to the second optical fiber 112. The propagation delay through the parallel sub-circuits is fixed by design so that the two output component signals may be combined with constructive interference.

Referring to the first drop sub-circuit 114, there is provided a first semiconductor optical amplifier 124, an optical bus 126, having provided along it a set of silicon micro-ring resonators (MRRs) 128, and a second SOA 130. The first SOA 124 is configured to amplify the DWDM comb of optical signals, either before the optical signals are processed by the MRRs 128 for transmission in the first direction, or after the optical signals are processed by the MRRs 128 for transmission in the second direction. Similarly, the second SOA 130 is configured to amplify the DWDM comb of optical signals, either after the optical signals are processed by the MRRs 128 for transmission in the first direction, or before the optical signals are processed by the MRRs 128 for transmission in the second direction.

The MRRs 128 are coupled to the optical bus 126 and act as optical switching elements to drop particular, respective wavelengths from the optical bus to local output ports 134. Each of the MRR optical switching elements has two states: a first, off-resonance state, in which a respective incoming DWDM channel passes along the optical bus 126 without coupling into the MRR and being dropped; and a second, on-resonance state, in which a specific wavelength of the DWDM channel corresponding to the resonance wavelength of the MRR is coupled into the MRR and dropped from the optical bus 126. Before transmission to a local output port 134, a dropped wavelength signal is guided to a drop PSR, such as a drop DPGC 136, for rotation and recombination processing with the corresponding wavelength polarization component from the second drop sub-circuit 116. Thus, optical signals whose wavelength corresponds to a MRR 128 in an on-resonance state will be dropped from the optical bus 126 to a respective local output port 134, while the remaining optical signals at different wavelengths, not corresponding to any on-resonance MRR, will by-pass or pass through the ROADM 100 to the second optical fiber 112.

The first drop sub-circuit 114 has a respective micro-ring resonator 128 for each wavelength ($\lambda_1, \lambda_2, \lambda_3, \ldots \lambda_N$) to be dropped. The number of MRRs 128 and corresponding local output ports 134 to drop to may vary, depending on application. Typically, there may be up to 12 MRRs 128 and a corresponding number of local output ports 134, although up to 24 MRRs and corresponding local output ports may be provided in some cases.

The second drop sub-circuit 116 is configured in a corresponding way, in parallel, to the first drop sub-circuit 114. The second drop sub-circuit 116 is therefore configured to drop or pass second polarization component wavelengths in correspondence with the dropping or passing of the first polarization component wavelengths on the first drop sub-circuit 114.

As noted above, the signal propagation direction through the drop circuit structure 102 may take place in a first direction, from the first input/output end 106 to the second input/output end 110, or in a second direction, from the second input/output end 110 to the first input/output end 106. While optical signals may be propagated in either direction, optical signals are not transmitted in both directions at the same time. The drop circuit structure 102 is configured for propagation in one direction at a time only. The bi-directional configuration of the drop circuit structure 102 allows for resilience protection of a ring network in which the drop circuit structure 102 operates. If a node of the ring should fail or an optical fiber in the network break, then the propagation direction may be reversed to allow optical signals still to be received and dropped by the drop circuit structure 102. To allow for the MRRs 128 to couple optical signals propagating in the second direction, 1×2 switches 138 are integrated to receive optical signals coupling to second, or back-up, paths from the MRRs 128, for transmission to the drop DPGCs 136 and local output ports 134.

So that the reversible propagation direction configuration may be fully effective, it can be seen that corresponding functional elements are provided in the same order in the drop circuit structure 102 for the second direction as for the first direction. For example, in a drop circuit structure, incoming optical signals are typically amplified before being dropped or passed through. Providing first and second SOAs 124, 130 on either end of the first optical bus 126 allows for such optical amplification to take place, whether the propagation direction is in the first or second direction.

Referring now to the add circuit structure 104, it will be appreciated that the configuration and operation of the add circuit structure is similar to that of the drop circuit structure 102, except that optical signals at given wavelengths are added to the structure instead of being dropped from the structure. Local input ports 140 provide optical signals at given, respective wavelengths, which are passed via respective add DPCGs 142, into the add circuit structure 104 for transmission to an outgoing optical fiber, third optical fiber 144 or fourth optical fiber 146, depending on the propagation direction.

To provide optical amplification in the ROADM 100, while allowing for adding or dropping in either propagation direction, it can be seen that eight semiconductor optical amplifiers are heterogeneously integrated with the silicon photonic device.

The techniques for integrating active devices, such as semiconductor optical amplifiers, with silicon photonic devices are generally subject to an ongoing desire to improve performance, yield, reliability, and/or cost, in particular to facilitate large-scale production of such devices. Alternative and/or improved integration implementations in view of the above background would therefore be of interest.

SUMMARY

According to a first aspect, there is provided a device for processing an optical signal. The device comprises a photonic device arranged between a first input/output and a second input/output. The photonic device is in optical communication with the first and second inputs/outputs by a signal path, the signal path for transmission of a first optical signal in a first direction from the first input/output to the second input/output or for transmission of a second optical signal in a second direction from the second input/output to the first input/output. The device further comprises an optical gain element for receiving the first or second optical signal and outputting an amplified first or second optical signal respectively. The device further comprises a path switching circuit. The path switching circuit comprises a first signal amplification path connectable between the first input/output and the photonic device for optically coupling the signal path to and from the optical gain element. The path switching circuit further comprises a second signal amplification path connectable between the photonic device and the second input/output for optically coupling the signal path to and from the optical gain element. The path switching circuit is arranged to selectively connect the first signal amplification path or the second signal amplification path into the signal path.

In this way, a single optical gain element may be configured for optically amplifying an optical signal, whether the optical signal is propagating in the first direction or the second direction. In particular, the single optical gain element may be configured to optically amplify an optical signal in a uniform or consistent manner, whether the optical signal is propagating in the first direction or the second direction. The functional stage along the signal path at which optical amplification is provided by the optical gain element may be configured to be the same for an optical signal propagating in either the first direction or second direction. This allows the device to operate on optical signals in a consistent way when the propagation direction of the optical signals is reversed. The device offers the above advantages while being provided with a single optical gain element, rather than a respective optical gain element on either side of the photonic device. As such, cost and fabrication complexity may be significantly reduced with this device, especially for embodiments in which the device is fabricated by hybrid integration of the optical gain element with the photonic device.

The path switching circuit may be configured to selectively connect, or introduce or add, the first signal amplification path into the signal path on a first side of the photonic device, between the first input/output and the photonic device. The path switching circuit may also be configured to selectively connect, or introduce or add, the second signal amplification path into the signal path on a second side of the photonic device, between the photonic device and the second input/output.

Optionally, the path switching circuit is arranged to selectively connect the first signal amplification path into the signal path, such that the first input/output is optically coupled to the optical gain element; the optical gain element is optically coupled to the photonic device; and the photonic device is optically coupled to the second input/output. The optical gain element may be selectively configurable to optically amplify the first optical signal upstream of the photonic device in the first direction. The optical gain element may also or alternatively be selectively configurable to optically amplify the second optical signal downstream of the photonic device in the second direction.

With the first signal amplification path included in the signal path, the signal path optically couples the first input/output to the optical gain element. The optical gain element is optically coupled to the photonic device. The photonic device is optically coupled to the second input/output. For propagation in the first direction, an optical signal is guided, or routed, along an active path from the first input/output to the optical gain element and is optically amplified to provide an amplified optical signal. The amplified optical signal is then routed to the photonic device for processing according to the particular optical function of the photonic device. The processed optical signal is then routed to the second input/output. For propagation in the second direction, an optical signal is guided, or routed, along an active path from the second input/output to the photonic device for processing according to the particular optical function of the photonic device. The processed optical signal is then routed to the optical gain element and is optically amplified to provide an amplified optical signal. The amplified optical signal is then routed to the first input/output.

Optionally, the path switching circuit is arranged to selectively connect the second signal amplification path into the signal path, such that the first input/output is optically coupled to the photonic device; the photonic device is optically coupled to the optical gain element; and the optical gain element is optically coupled to the second input/output. The optical gain element may be selectively configurable to optically amplify the first optical signal downstream of the photonic device in the first direction. The optical gain element may also or alternatively be selectively configurable to optically amplify the second optical signal upstream of the photonic device in the second direction.

With the second signal amplification path included in the signal path, the signal path optically couples the first input/output to the photonic device. The photonic device is optically coupled to the optical gain element. The optical gain element is optically coupled to the second input/output. For propagation in the first direction, an optical signal is guided, or routed, along an active path from the first input/output to the photonic device for processing according to the particular optical function of the photonic device. The processed optical signal is then routed to the optical gain element and is optically amplified to provide an amplified optical signal. The amplified optical signal is then routed to the second input/output. For propagation in the second direction, an optical signal is guided, or routed, along an active path from the second input/output to the optical gain element and is optically amplified to provide an amplified optical signal. The amplified optical signal is then routed to the photonic device for processing according to the particular optical function of the photonic device. The processed optical signal is then routed to the first input/output.

The photonic device may comprise a polarization-sensitive device. The signal path may comprise a polarization-sensitive signal path. In particular, the photonic device may be provided on a silicon photonics, or SOI, platform or substrate.

Optionally, the polarization-sensitive signal path comprises a first polarization component signal path for transmission of first polarization component signals and a second polarization component signal path for transmission of second polarization component signals. The optical gain element and the path switching circuit may be connected to the first polarization component signal path. The device may further comprise a second optical gain element for receiving the second polarization component signals and outputting amplified second polarization components. The device may also further comprise a second path switching circuit comprising a third signal amplification path connectable to the second polarization component signal path between the first input/output and the polarization-sensitive photonic device for optically coupling the second polarization component signal path to and from the second optical gain element; and a fourth signal amplification path connectable to the second polarization component signal path between the polarization-sensitive photonic device and the second input/output for optically coupling the second polarization component signal path to and from the second optical gain element. The second path switching circuit may be arranged to selectively connect the third signal amplification path or the fourth signal amplification path into the second polarization component signal path. In this way, a photonic device incorporating a polarization diversity scheme, or providing two polarization component paths, may be connected to a respective optical gain element and path switching circuit for each polarization component path. The number of optical gain elements provided with this arrangement may thereby be reduced.

Optionally, the photonic device comprises a plurality of signal paths, each signal path being connected to a respective path switching circuit and a respective optical gain element. In this way, rather than providing multiple optical gain elements on any particular signal path, a single optical gain element may instead be provided.

Optionally, the optical gain element is polarization-insensitive. In this way, the optical gain element may function outside of any polarization-sensitive portions of the device. In this specification, a component/element is considered to be polarization-insensitive, or polarization-independent, if it exhibits low, or no, polarization dependence. Optionally, the path switching circuit is polarization-insensitive. Optionally, the first signal amplification path is selectively connectable into a first portion of the signal path between the first input/output and the photonic device, the first portion not comprising the polarization-sensitive signal path. Optionally, the second signal amplification path is selectively connectable into a second portion of the signal path between the photonic device and the second input/output, the second portion not comprising the polarization-sensitive signal path. In this way, configurations of the path switching circuit outside of any polarization-sensitive portions of the device may be provided.

Optionally, the path switching circuit further comprises a first spot-size converter configured upstream of the polarization-insensitive optical gain element. The first spot-size converter may be configured to convert a first spot-size of the signal path upstream of the optical gain element to a second spot-size of the optical gain element. The path switching circuit may also optionally comprise a second spot-size converter configured downstream of the polarization-insensitive optical gain element, the second spot-size converter configured to convert the second spot-size of the optical gain element to a third spot-size of the signal path downstream of the optical gain element. The first spot-size and the third spot-size may be the same. In this way, coupling of optical signals at the spot-size, or mode size, of the signal path upstream of the optical gain element, for example, an optical fiber spot-size, into the optical gain element spot-size may be achieved. Similarly, coupling of optical signals at the spot-size of the optical gain element into the spot-size of the signal path downstream of the optical gain element may be achieved.

Optionally, the photonic device and the or each path switching circuit are monolithically integrated in a silicon photonics circuit. In this way, the device may be provided in a relatively small footprint and with the manufacturing and cost benefits associated with CMOS fabrication technologies, for example. Any incremental cost associated with the additional path switching circuit, including additional silicon waveguide structures and switches and possibly also splitter-combiners, is negligible compared with the cost saving by removing one or more optical amplifiers.

Optionally, the or each optical gain element comprises a semiconductor optical amplifier, SOA. Optionally still, the SOA may be formed from III-V material, such as InP.

Optionally, the or each SOA is hybrid integrated with the silicon photonics circuit. In this way, the device may be provided in a relatively small footprint, and, with the reduction in number of SOAs configured in the device, at a potentially reduced cost and manufacturing complexity.

Optionally, there is provided a reconfigurable optical add/drop multiplexer, ROADM, which may comprise the device. Compared with the ROADM of FIG. 1, a reduction in the number of optical gain elements configured in the ROADM may be achieved.

Optionally, the ROADM comprises first and second polarization component add signal paths and first and second polarization component drop signal paths, with each signal path being connected to a respective path switching circuit and a respective optical gain element. In this way, the number of optical gain elements configured in the ROADM may be reduced from eight to four, compared with the ROADM of FIG. 1, offering the advantage of significant savings in manufacturing complexity and cost.

Optionally, the ROADM comprises first and second polarization component add signal paths and first and second polarization component drop signal paths. The first and second polarization component add signal paths may be connected to a first polarization-insensitive path switching circuit and a first polarization-insensitive optical gain element. The first and second polarization component drop signal paths may be connected to a second polarization-insensitive path switching circuit and a second polarization-insensitive optical gain element. In this way, the number of optical gain elements configured in the ROADM may be reduced from eight to two, compared with the ROADM of FIG. 1, offering the advantage of significant savings in manufacturing complexity and cost.

According to a second aspect, there is provided a method for processing an optical signal. The method comprises receiving an optical signal at a first input/output or a second input/output. The method further comprises transmitting the optical signal either from the first input/output in a first direction along a signal path to a photonic device and from the photonic device to the second input/output, or from the second input/output in a second direction along the signal path to the photonic device and from the photonic device to the first input/output. The method further comprises amplifying the optical signal at an optical gain element by selectively directing the optical signal to either a first signal amplification path or a second signal amplification path. The first signal amplification path optically couples the signal path between the first input/output and the photonic device to and from the optical gain element, and the second signal amplification path optically couples the signal path between the photonic device and the second input/output to and from the optical gain element.

Other preferred features and advantages are set out in the description and in the dependent claims which are appended hereto.

BRIEF DESCRIPTION OF THE DRAWINGS

The invention may be put into practice in a number of ways and some embodiments will now be described, by way of non-limiting example only, with reference to the following figures, in which:

FIG. 15A schematically shows a side view and FIG. 15B schematically shows a top view of a polarization-insensitive amplification configuration in accordance with a further embodiment;

FIG. 16A schematically shows a side view and FIG. 16B schematically shows a top view of a spot-size converter configuration in accordance with a further embodiment.

DETAILED DESCRIPTION

Figure 2:
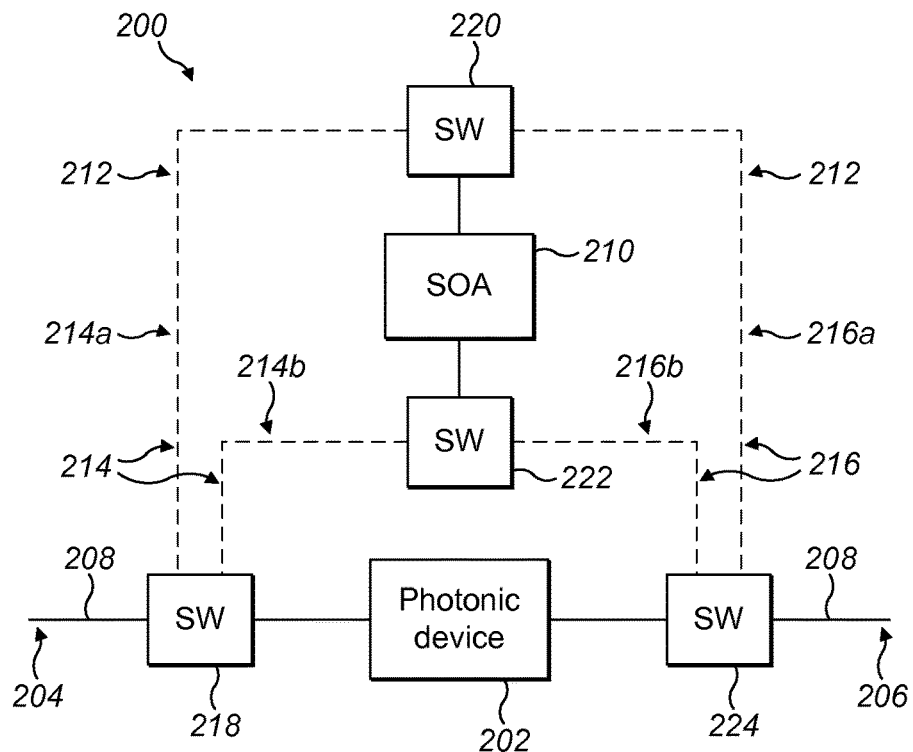
FIG. 2 schematically shows a device in accordance with a first embodiment.

Referring to FIG. 2, there is shown a device 200 for processing an optical signal in accordance with a first embodiment. The device 200 includes a photonic device 202 arranged between a first input/output 204 and a second input/output 206. The photonic device 200 is in optical communication with the first and second inputs/outputs 204,206 by a signal path 208. The signal path 208 may be configured for transmission of a first optical signal in a first direction from the first input/output 204 to the second input/output 206. The signal path 208 may alternatively be configured for transmission of a second optical signal in a second direction from the second input/output 206 to the first input/output 204. The device 200 also includes an optical gain element for receiving the first or second optical signal and outputting an amplified first or second optical signal, respectively. In this embodiment, the optical gain element is provided as a semiconductor optical amplifier 210.

The device 200 also includes a path switching circuit 212. The path switching circuit 212 provides a first signal amplification path 214 connectable between the first input/output 204 and the photonic device 202 for optically coupling the signal path 208 to and from the SOA 210. The path switching circuit 212 further provides a second signal amplification path 216 connectable between the photonic device 202 and the second input/output 206 for optically coupling the signal path 208 to and from the SOA 210. The path switching circuit 212 is arranged to selectively connect the first signal amplification path 214 or the second signal amplification path 216 into the signal path 208.

In order to effect the path switching, the path switching circuit 212 is provided with a number of switching elements (SW). The switching elements may be provided by switches, or a combination of switches and splitter-combiners, as will be described more fully below. The switching elements (switches and/or splitter-combiners) may be provided as wavelength-independent, passive, optical elements. This allows for common operation on multiple-wavelength signals; for example, (D)WDM optical signals.

A switch may be configured as a 1×N switch, having a single port on one side and N (two or more) ports on the other side. An optical signal input to the single port may be selectively switched to be output from any one of the N ports. Alternatively, in the reverse configuration, an optical signal input to one of the N ports may be selectively output from the single port only when the switch is configured to that particular port of the N ports; otherwise, the signal is not passed onwards. A switch may alternatively be configured as an M×N switch (or cross-connect), having M ports on one side and N ports on the other side. In this case, any one of the M ports may be connected to any one of the N ports. Such a switch may be configured with the M ports as the input side, to allow an optical signal input to one of the M ports to be output to one of the N ports. At the same time, the switch may be configured to allow further optical signals input to any of the other M ports to be output to a respective one of the other N ports. Alternatively, the switch may be configured with the N ports as the input side, to allow an optical signal input to one of the N ports to be output to one of the M ports. At the same time, the switch may be configured to allow further optical signals input to any of the other N ports to be output to a respective one of the other M ports. In this way, switching may be provided by 1×2, 2×1, and/or 2×2 switches, among others.

A splitter-combiner may be configured as a splitter only; for example, when arranged such that an optical signal travels into a single input port and multiple optical signals leave via two (or more) output ports. A splitter-combiner may alternatively be configured as a combiner only; for example, when arranged such that multiple optical signals travel into two (or more) input ports and a combined optical signal leaves via a single output port. A splitter-combiner may alternatively still be configured as both a splitter and a combiner; for example, when arranged such that optical signals may be received as the input at either the single port side or the multi-port side and may leave as the output on the other side.

In this embodiment, the first signal amplification path 214 includes a first signal amplification sub-path 214a and a second signal amplification sub-path 214b. The first signal amplification path 214 is optically coupled to a first switching element 218, a second switching element 220, and a third switching element 222. The first switching element 218 is provided on the signal path 208 between the first input/output 204 and the photonic device 202. The first switching element 218 may be configured to connect the signal path 208 to the first signal amplification sub-path 214a. The first switching element 218 is coupled to the second switching element 220 by the first signal amplification sub-path 214a. The second switching element 220 is coupled to the SOA 210. The SOA 210 is coupled to the third switching element 222. The third switching element 222 is coupled back to the first switching element 218 by the first signal amplification sub-path 214b. In this way, the path switching circuit 212 may be configured to divert optical signals received from the signal path 208, from either the first or second direction, away from the signal path 208 onto the first signal amplification path 214, to the SOA 210 and then back to the signal path 208 from the SOA 210, for onward transmission on the signal path 208. In the first direction, the optical signals would then pass into the photonic device 202, while, in the second direction, the optical signals would pass to the first input/output 204. In this way, it may be generally seen that the path switching circuit 212 may be configured such that the first input/output 204 and the SOA 210 are optically coupled with each other, the SOA 210 and the photonic device 202 are optically coupled with each other, and the photonic device 202 and the second input/output 206 are optically coupled with each other.

In this embodiment, the second signal amplification path 216 includes a second signal amplification sub-path 216a and a second signal amplification sub-path 216b. The second signal amplification path 216 is optically coupled to a fourth switching element 224, the second switching element 220, and the third switching element 222. The fourth switching element 224 is provided on the signal path 208 between the second input/output 206 and the photonic device 202. The fourth switching element 224 may be configured to connect the signal path 208 to the second signal amplification sub-path 216a. The fourth switching element 224 is coupled to the second switching element 220 by the second signal amplification sub-path 216a. The second switching element 220 is coupled to the SOA 210. The SOA 210 is coupled to the third switching element 222. The third switching element 222 is coupled back to the fourth switching element 224 by the second signal amplification sub-path 216b. In this way, the path switching circuit 212 may be configured to divert optical signals received from the signal path 208, from either the first or second direction, away from the signal path 208 onto the second signal amplification path 216, to the SOA 210 and then back to the signal path 208 from the SOA 210, for onward transmission on the signal path 208. In the second direction, the optical signals would then pass into the photonic device 202, while, in the first direction, the optical signals would pass to the second input/output 206. In this way, it may be generally seen that the path switching circuit 212 may be configured such that the first input/output 204 and the photonic device 202 are optically coupled with each other, the photonic device 202 and the SOA 210 are optically coupled with each other, and the SOA 210 and the second input/output 206 are optically coupled with each other.

The first switching element 218 may be provided by a M×N optical switch. In this embodiment, the first switching element 218 may be provided by a 2×2 optical switch. Alternatively, the first switching element 218 may be provided by a combination of optical switches and splitter-combiners. The second switching element 220 may be provided by a 2×1 optical switch. Alternatively, the second switching element 220 may be provided by a combiner. The third switching element 222 may be provided by a 1×2 optical switch. Alternatively, the third switching element 222 may be provided by a splitter. The fourth switching element 224 may be provided by a M×N optical switch. In this embodiment, the fourth switching element 224 may be provided by a 2×2 optical switch. Alternatively, the fourth switching element 224 may be provided by a combination of optical switches and splitter-combiners.

The signal path 208 is shown in FIG. 2 with a solid line from the first input/output 204 to the second input/output 206, because the signal path 208 is active during use of the device 200. This is also the case for the common sub-path coupling the second switching element 220 to the SOA 210 and the common sub-path coupling the SOA 210 to the third switching element 222. The path switching circuit 212, however, is selectively configurable to introduce either the first signal amplification path 214 or the second signal amplification path 216. These paths 214,216 are therefore shown with dashed lines to indicate that one or other of the paths 214,216 may be inactive during use of the device 200.

FIGS. 3-6 schematically show the device 200 in different operational modes for amplifying an optical signal. In these figures, solid lines with arrows indicate active sub-paths for signal transmission in the device 200, while dashed lines indicate current inactive sub-paths.

Figure 3:
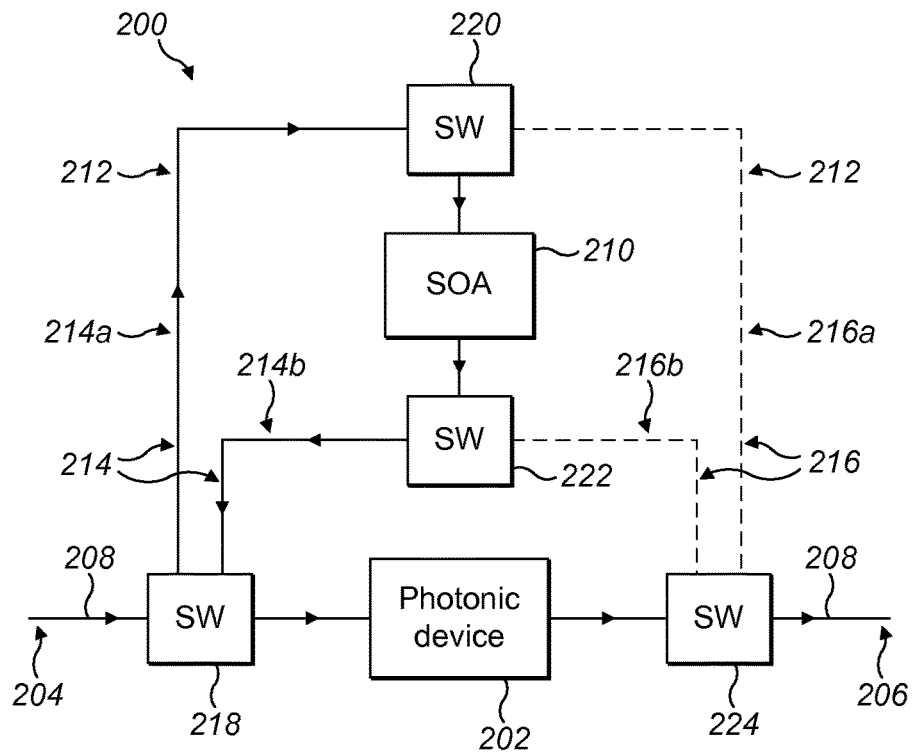
FIG. 3 schematically shows the device of FIG. 2 in a first operational mode.

In the embodiment of FIG. 3, the device 200 is configured to optically amplify a first optical signal from the first input/output 204 upstream of the photonic device 202 in the first direction. The first switching element 218 selectively connects the signal path 208 from the first input/output 204 to the first signal amplification sub-path 214a. The second switching element 220 selectively connects the first signal amplification sub-path 214a to the SOA 210. The SOA 210 is coupled between the second switching element 220 and the third switching element 222. The third switching element 222 selectively connects the SOA 210 to the first signal amplification sub-path 214b, back to the first switching element 218. The first switching element 218 selectively connects the first signal amplification sub-path 214b to the signal path 208 towards the photonic device 202. From the photonic device 202, the signal path 208 passes to the second input/output 206 via the fourth switching element 224.

In this way, the first optical signal may be received from the first input/output 204 and follow an active path onto the signal path 208. The active path for the first optical signal is then directed onto the first signal amplification path 214 and the first optical signal is amplified by the SOA 210. The amplified first optical signal is then passed back onto the signal path 208 for transmission to the photonic device 202, for processing according to the particular function(s) the photonic device is configured to perform, and then transmitted along the active path to the second input/output 206.

Figure 4:
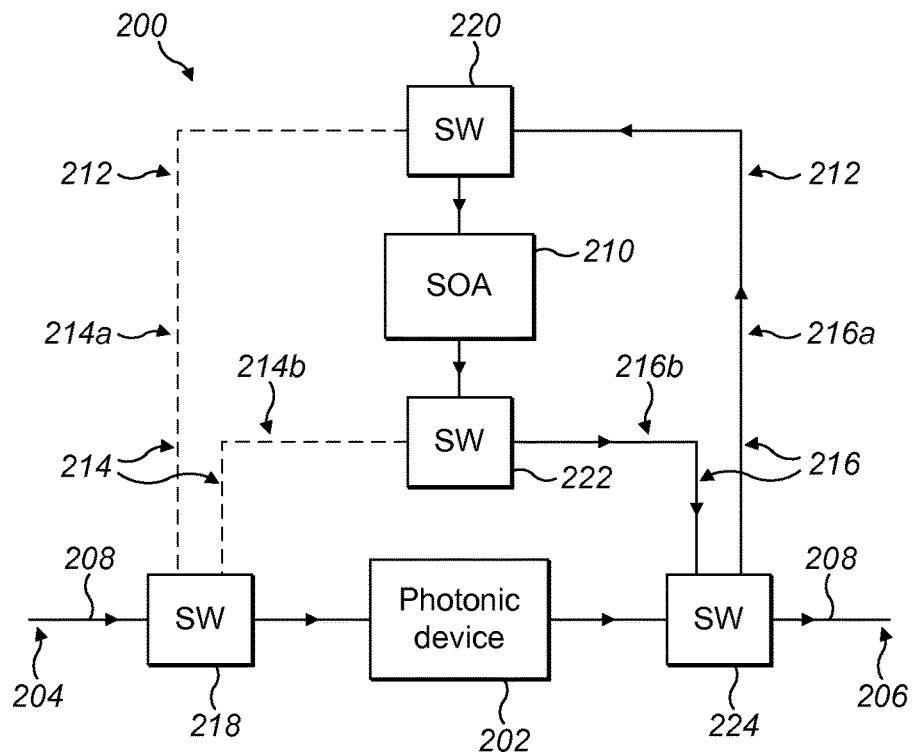
FIG. 4 schematically shows the device of FIG. 2 in a second operational mode.

In the embodiment of FIG. 4, the device 200 is configured to optically amplify a first optical signal from the first input/output 204 downstream of the photonic device 202 in the first direction. The active path begins at signal path 208, passing from the first input/output 204 via the first switching element 218 to the photonic device 202. The fourth switching element 224 selectively connects the signal path 208 from the photonic device 202 to the second signal amplification sub-path 216a. The second switching element 220 selectively connects the second signal amplification sub-path 216a to the SOA 210. The SOA 210 is coupled between the second switching element 220 and the third switching element 222. The third switching element 222 selectively connects the SOA 210 to the second signal amplification sub-path 216b, back to the fourth switching element 224. The fourth switching element 224 selectively connects the second signal amplification sub-path 216b to the signal path 208 towards the second input/output 206.

In this way, the first optical signal may be received from the first input/output 204 and follow an active path onto the signal path 208. The active path for the first optical signal continues to the photonic device 202, for processing according to the particular function(s) the photonic device is configured to perform, and then continues further along the signal path 208. The active path for the first optical signal is then directed onto the second signal amplification path 216 and the first optical signal is amplified by the SOA 210. The amplified first optical signal is then passed back onto the signal path 208 for transmission along the active path to the second input/output 206.

Figure 5:
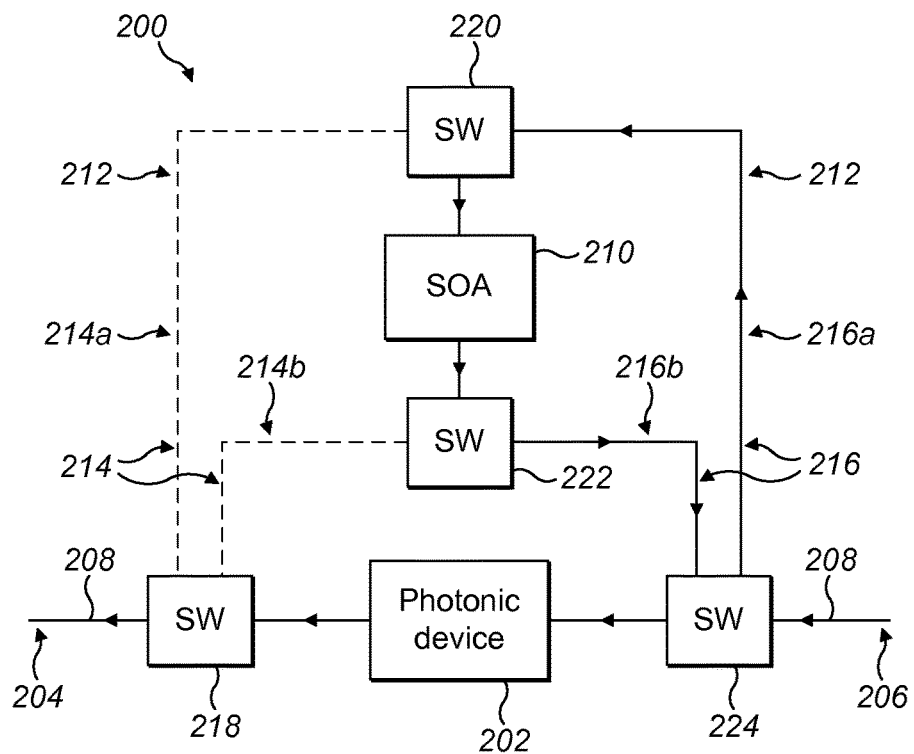
FIG. 5 schematically shows the device of FIG. 2 in a third operational mode.

In the embodiment of FIG. 5, the device 200 is configured to optically amplify a second optical signal from the second input/output 206 upstream of the photonic device 202 in the second direction. The fourth switching element 224 selectively connects the signal path 208 from the second input/output 206 to the second signal amplification sub-path 216a. The second switching element 220 selectively connects second signal amplification sub-path 216a to the SOA 210. The SOA 210 is coupled between the second switching element 220 and the third switching element 222. The third switching element 222 selectively connects the SOA 210 to the second signal amplification sub-path 216b, back to the fourth switching element 224. The fourth switching element 224 selectively connects the second signal amplification sub-path 216b to the signal path 208 towards the photonic device 202. From the photonic device 202, the signal path 208 passes to the first input/output 204 via the first switching element 218.

Figure 6:
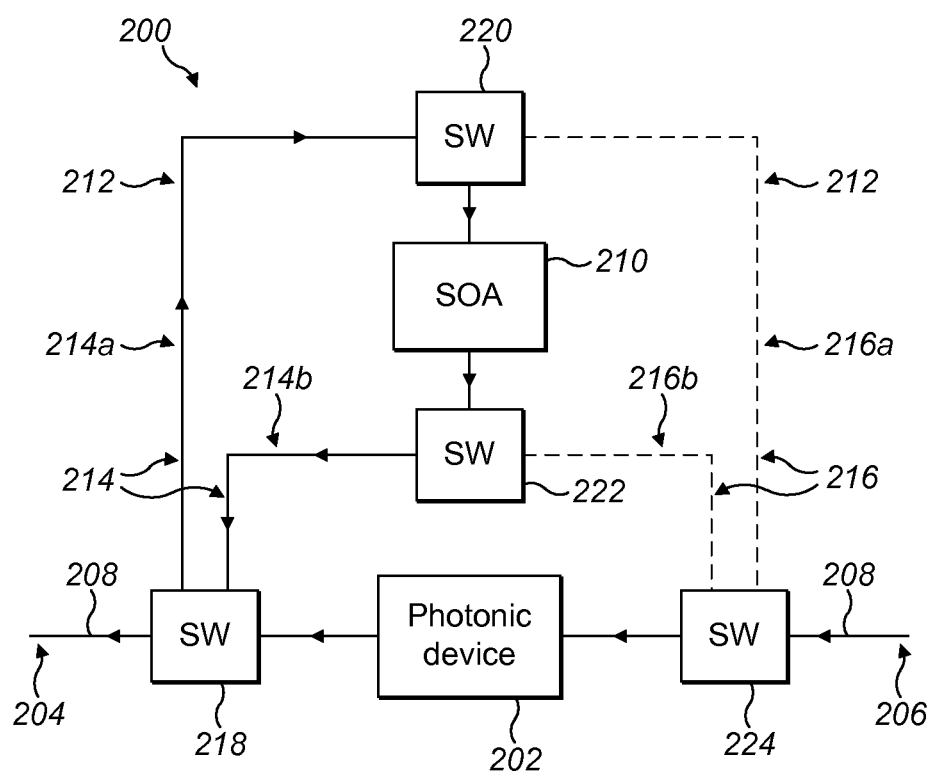
FIG. 6 schematically shows the device of FIG. 2 in a fourth operational mode.

In this way, the second optical signal may be received from the second input/output 206 and follow an active path onto the signal path 208. The active path for the second optical signal is then directed onto the second signal amplification path 216 and the second optical signal is amplified by the SOA 210. The amplified second optical signal is then passed back onto the signal path 208 for transmission to the photonic device 202, for processing according to the particular function(s) the photonic device is configured to perform, and then transmitted along the active path to the first input/output 204. In the embodiment of FIG. 6, the device 200 is configured to optically amplify a second optical signal from the second input/output 206 downstream of the photonic device 202 in the second direction. The active path begins at signal path 208, passing from the second input/output 206 via the fourth switching element 224 to the photonic device 202. The first switching element 218 selectively connects the signal path 208 from the photonic device 202 to the first signal amplification sub-path 214a. The second switching element 220 selectively connects the first signal amplification sub-path 214a to the SOA 210. The SOA 210 is coupled between the second switching element 220 and the third switching element 222. The third switching element 222 selectively connects the SOA 210 to the first signal amplification sub-path 214b, back to the first switching element 218. The first switching element 218 selectively connects the first signal amplification sub-path 214b to the signal path 208 towards the first input/output 204.

In this way, the second optical signal may be received from the second input/output 206 and follow an active path onto the signal path 208. The active path for the second optical signal continues to the photonic device 202, for processing according to the particular function(s) the photonic device is configured to perform, and then continues further along the signal path 208. The active path for the second optical signal is then directed onto the first signal amplification path 214 and the second optical signal is amplified by the SOA 210. The amplified second optical signal is then passed back onto the signal path 208 for transmission along the active path to the first input/output 204.

It can be seen from the above embodiments that a single gain element, here in the form of the SOA, may be selectively configured to amplify an optical signal, either before or after processing by a photonic device, and whether the propagation direction is in a first or second direction in the device. In this way, amplification of an optical signal may be provided at the same functional stage through the device for propagation in the first direction or the second direction. The path switching circuit provides for reconfiguration of the active path in the device, such that a single gain element may be configured to provide optical amplification for any of the operational modes shown in FIGS. 3-6. Such an arrangement allows for a reduced number of gain elements to be provided in the device, thereby offering savings in cost and manufacturing complexity.

The photonic device in the above embodiments, and indeed in the following embodiments, may include a range of different devices configured to pass, bypass, process, and/or perform one or more photonic functions on an optical signal. The photonic device may include one or more photonic elements, including waveguides, micro-ring resonators, filters, splitters, spot-size converters, polarization splitters-rotators, optical switches, variable optical attenuators, isolators, optical amplifiers, modulators, and photodiodes, among others. For example, the photonic device may include a reconfigurable optical add multiplexer (ROAM). The photonic device may include a reconfigurable optical drop multiplexer (RODM). The photonic device may include a reconfigurable optical add/drop multiplexer (ROADM).

The device 200 may be provided as an integrated optical device. For example, the device 200 may be fabricated using silicon photonics or silicon-on-insulator platforms, taking advantage of CMOS fabrication techniques which may be employed for this. In particular, the photonic device 202, the signal path 208, and the path switching circuit 212 may be monolithically integrated on a silicon-on-insulator substrate. The gain element in the form of the SOA—for example, made from III-V group materials, such as InP or GaAs— may then be hybrid integrated with the silicon photonics circuit. While SOAs may be hybrid (or heterogeneously) integrated with silicon photonics circuits, monolithic integration techniques may alternatively be used to fabricate silicon photonics circuits and SOAs together. It is expected that such monolithic integration techniques will become more widespread as fabrication processes and costs improve. Germanium-based semiconductor optical amplifiers may also be used. A germanium-based SOA may be monolithically integrated with a silicon photonics circuit.

Providing the device at least in part using silicon photonics gives rise to considerations of the polarization-sensitivity of silicon optical waveguides. In view of this, embodiments may employ a polarization diversity scheme to provide a dual polarization structure in the device. The photonic device structure may be divided into a first polarization component structure and a second polarization component structure. A first polarization splitter-rotator (PSR)—in some embodiments in the form of a dual polarization grating coupler (DPGC)—may be provided at the first input/output end 204. The first DPGC splits the unknown and random polarization of input optical signals into two orthogonal polarization components, namely TE and TM components. The DPGC then rotates one of the components by 90° so that both components have the same polarization at the output of the DPGC. One component may then be output to the first polarization component structure and the other component may be output to the second polarization component structure, with the polarizations of both components now corresponding to the linear polarization mode of the silicon optical waveguide structures of the polarization component structures. From there, the two component optical signals may be processed identically, in parallel, along the first and second polarization component structures, respectively. At the second input/output end 206, a second polarization splitter-rotator (PSR)—in some embodiments in the form of a dual polarization grating coupler (DPGC)—may be provided. The processed component optical signals may be output from the first and second polarization component structures to the second DPGC. The second DPGC performs the reverse procedure on the component optical signals, rotating the polarization of one of the components and recombining the components into output optical signals for onward transmission at the second input/output 206.

To provide optical amplification for the first and second polarization component signals, a respective gain element and path switching circuit may be provided for each of the first and second polarization component structures, respectively.

Figure 7:
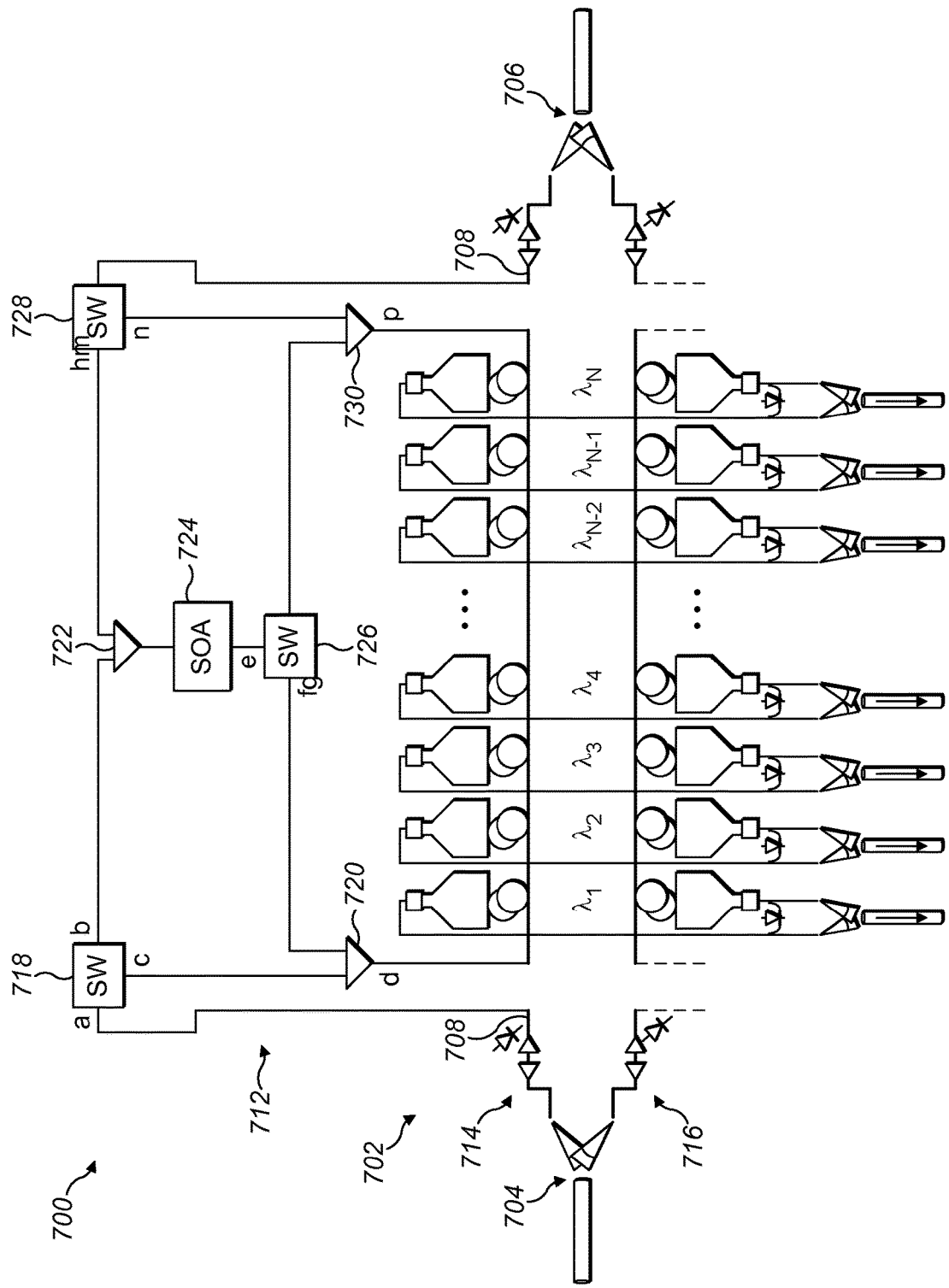
FIG. 7 schematically shows a drop circuit of a ROADM in accordance with a further embodiment.

FIG. 7 shows an embodiment in which the photonic device is provided as a drop circuit structure 702 of a ROADM. The structure is polarization-sensitive and the drop circuit structure 702 is split into a first drop sub-circuit 714 for processing a first polarization component signal and a second drop sub-circuit 716 for processing a second polarization component signal. A path switching circuit 712 is connected to the first drop sub-circuit 714. A second path switching circuit may also in some embodiments be connected to the second drop sub-circuit 716. However, for simplicity of explanation, a second path switching circuit is not shown in FIG. 7. The description of the path switching circuit 712 for the first drop sub-circuit 714 will be understood to apply in an analogous manner to a second path switching circuit for the second drop sub-circuit 716.

With a ROADM, a path switching circuit may be implemented as described above with respect to FIGS. 2 to 6. Alternatively, as shown in FIG. 7, the path switching circuit 712 is provided by a combination of optical switches and splitter-combiners. The switches in this embodiment may be provided by 1×2 optical switches. The path switching circuit 712 is configured for providing optical amplification at the input end, or upstream of the photonic device—in this embodiment, the drop structure—in either direction of propagation.

In the path switching circuit 712, the signal path 708 of the first drop sub-circuit 714 is coupled from the first input/output 704 to a first optical switch 718. The path is directed from there to a SOA 724 via a first combiner 722. The SOA 724 is optically coupled to a second switch 726, which directs the path to a second combiner 720. From the second combiner 720, the path rejoins the signal path 708 and passes through the drop structure. At the end of the drop structure, the signal path 708 is coupled to a splitter-combiner 730 and to a third switch 728, which directs the path to the signal path 708 towards the second input/output 706.

In this way, a first polarization component signal from the first input/output 704 on the signal path 708 will be directed to port a of the first switch 718. The signal will leave port b of the first switch 718 and pass into the first combiner 722 to the SOA 724. From the SOA 724, the signal will pass into port e of the second switch 726 and leave at port f. The signal will then pass into the second combiner 720 and, from port d, back to the signal path 708 for processing in the drop structure. After being processed in the drop structure, the signal will be directed from the signal path 708 to port p of the third splitter-combiner 730. The third splitter-combiner 730 passes the signal to port n of the third switch 728. The signal leaves the third switch 728 from port m and returns to the signal path 708 towards the second input/output 706.

For a signal propagating in the second direction, from the second input/output 706 to the first input/output 704, the signal path 708 will be directed to port m of the third switch 728. The signal will leave port h of the third switch 728 and pass into the first combiner 722 to the SOA 724. From the SOA 724, the signal will pass into port e of the second switch 726 and leave at port g. The signal will then pass into the third splitter-combiner 730 and, from port p, back to the signal path 708 for processing in the drop structure. After being processed in the drop structure, the signal will be redirected from the signal path 708 to port d of the first splitter-combiner 720. The first splitter-combiner 720 passes the signal to port c of the first switch 718. The signal leaves the first switch 718 from port a and returns to the signal path 708 towards the first input/output 704.

Figure 8:
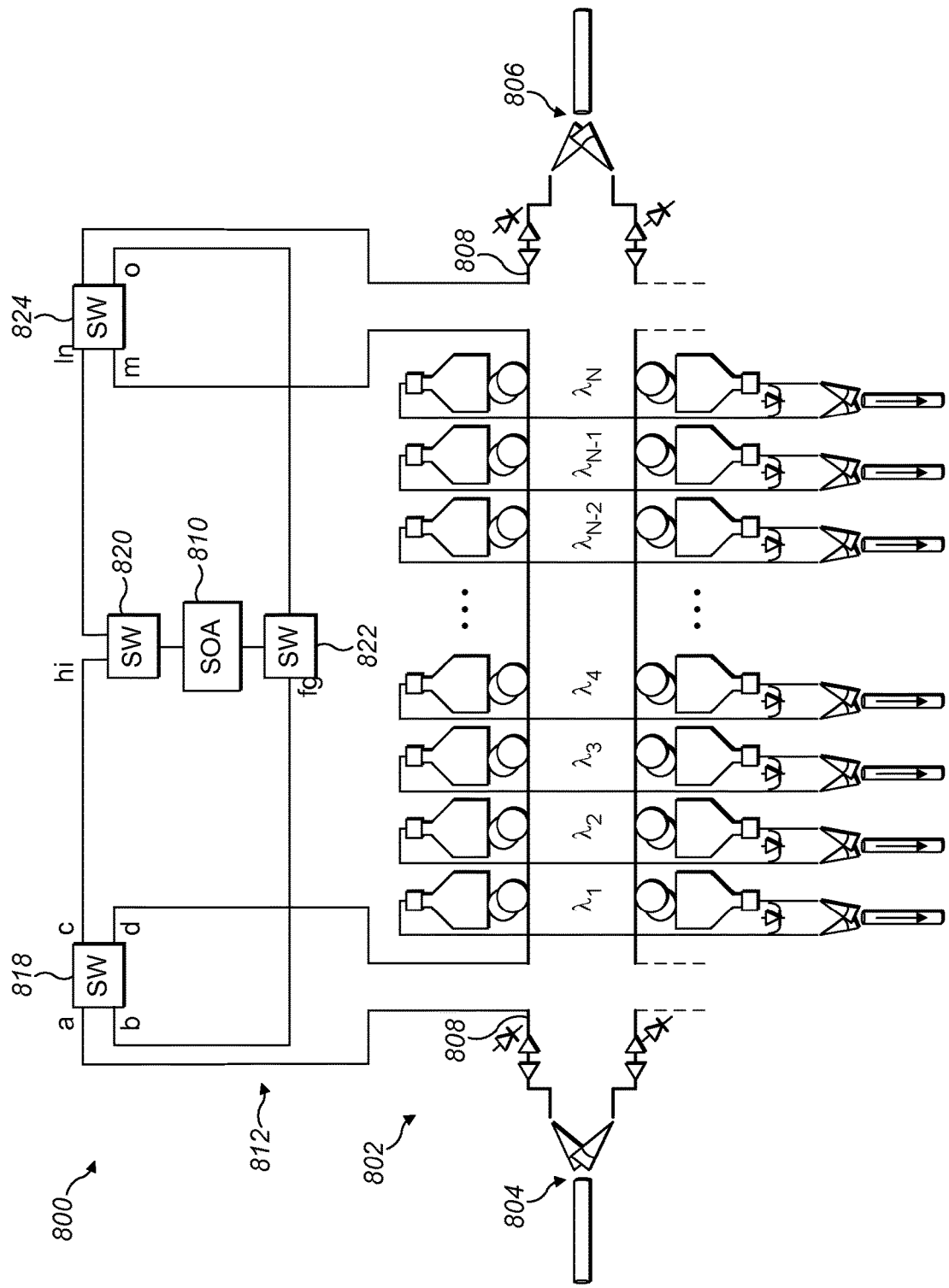
FIG. 8 schematically shows a drop circuit of a ROADM in accordance with a further embodiment.

FIG. 8 shows another embodiment, in which the photonic device is provided as a drop circuit structure 802 of a ROADM. The structure is polarization-sensitive and the drop circuit structure 802 is split into a first drop sub-circuit for processing a first polarization component signal and a second drop sub-circuit for processing a second polarization component signal. A path switching circuit 812 is connected to the first drop sub-circuit. A second path switching circuit may also in some embodiments be connected to the second drop sub-circuit. However, for simplicity of explanation, a second path switching circuit is not shown in FIG. 8. The description of the path switching circuit 812 for the first drop sub-circuit will be understood to apply in an analogous manner to a second path switching circuit for the second drop sub-circuit.

In this embodiment, the path switching circuit 812 is not provided by a combination of switches and splitter-combiners, but by switches only. This may be advantageous in reducing losses in the path switching circuit. A 2×2 optical switch typically incurs lower losses than a splitter-combiner, for example. In this embodiment, the first and fourth switches 818,824 are 2×2 optical switches and the second and third switches 820,822 are 1×2 optical switches, although other switch types and combinations may be employed.

In the path switching circuit 812, the signal path 808 is coupled from the first input/output 804 to a first optical switch 818. The path is directed from there to a SOA 810 via a second optical switch 820. The SOA 810 is optically coupled to a third switch 822, which directs the path back to the first switch 818. From the first switch 818, the path rejoins the signal path 808 and passes through the drop structure. At the end of the drop structure, the signal path 808 is coupled to a fourth switch 824, which directs the path to the signal path 808 towards the second input/output 806.

In this way, a first polarization component signal from the first input/output 804 on the signal path 808 will be directed to port a of the first switch 818. The signal will leave port c of the first switch 818 and pass into port h of the second switch 820 and then to the SOA 810. From the SOA 810, the signal will pass to the third switch 822 and leave at port f. The signal will then pass back to the first switch 818 at port b and, from port d, pass back to the signal path 808 for processing in the drop structure. After being processed in the drop structure, the signal will be directed from the signal path 808 to port m of the fourth switch 824. The signal will leave the fourth switch at port n and return to the signal path 808 towards the second input/output 806. In this configuration, port a is connected to port c, and port b is connected to port d, in the first switch 818. Port h is active and port i is inactive in the second switch 820. Port f is active and port g is inactive in the third switch 822. Port m is connected to port n, and port o is connected to port l, in the fourth switch 824.

For a signal propagating in the second direction, from the second input/output 806 to the first input/output 804, the signal path 808 will be directed to port n of the fourth switch 824. The signal will leave port l of the fourth switch 824 and pass into port i of the second switch 820 and then to the SOA 810. From the SOA 810, the signal will pass to the third switch 822 and leave at port g. The signal will then pass back to the fourth switch 824 at port o and, from port m, pass back to the signal path 808 for processing in the drop structure. After being processed in the drop structure, the signal will be directed from the signal path 808 to port d of the first switch 818. The signal will leave the first switch at port a and return to the signal path 808 towards the first input/output 804. In this configuration, port a is connected to port d, and port b is connected to port c, in the first switch 818. Port i is active and port h is inactive in the second switch 820. Port g is active and port f is inactive in the third switch 822. Port m is connected to port o, and port l is connected to port n, in the fourth switch 824.

The device 800 has been described in configurations in which optical amplification is provided to the incoming signal, upstream of the photonic device. However, with appropriate configuration of the switching elements—for example, which ports are active or inactive and which ports couple to which ports in the switches—the device 800 may be configured to provide optical amplification to the outgoing signal, downstream of the photonic device.

Figure 9:
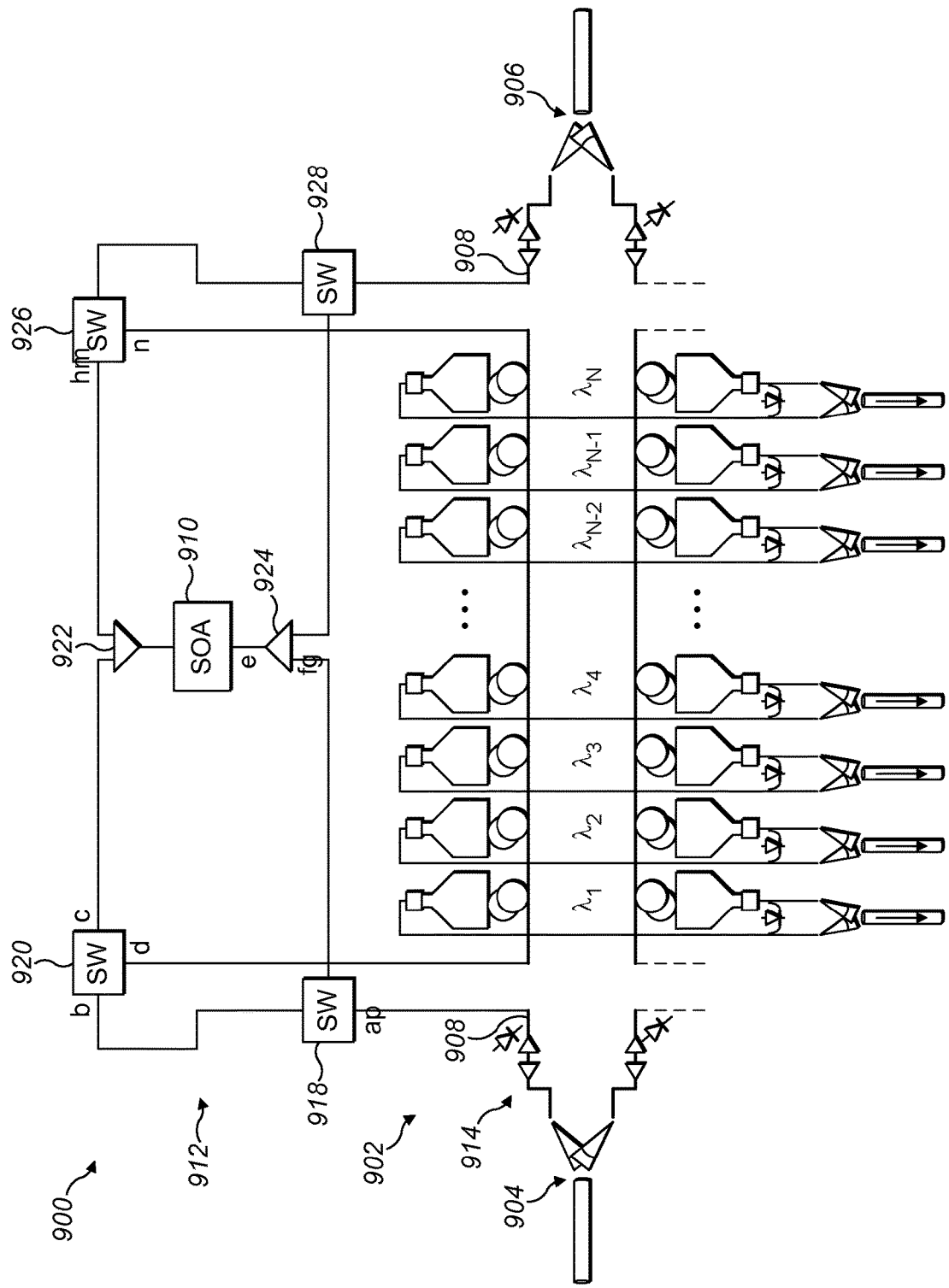
FIG. 9 schematically shows a drop circuit of a ROADM in accordance with a further embodiment.

FIG. 9 shows another embodiment, in which the photonic device is provided as a drop circuit structure 902 of a ROADM. The structure is polarization-sensitive and the drop circuit structure 902 is split into a first drop sub-circuit 914 for processing a first polarization component signal and a second drop sub-circuit for processing a second polarization component signal. A path switching circuit 912 is connected to the first drop sub-circuit 914. A second path switching circuit may also in some embodiments be connected to the second drop sub-circuit. However, for simplicity of explanation, a second path switching circuit is not shown in FIG. 9. The description of the path switching circuit 912 for the first drop sub-circuit will be understood to apply in an analogous manner to a second path switching circuit for the second drop sub-circuit.

In this embodiment, the path switching circuit 912 is configured for providing optical amplification at the output end, or downstream of the photonic device—in this embodiment, the drop structure—in either direction of propagation. Whether optical amplification is provided upstream or downstream of the photonic device may depend on the function(s) to be provided by the photonic device. With a ROADM, it is generally desirable to provide optical amplification to the incoming signal to the drop structure and to provide optical amplification to the outgoing signal from the add structure. However, optical amplification may be provided in the reverse configuration in some implementations. It will be appreciated that, while FIG. 9 is shown with a drop structure—in particular, with detail of a path switching circuit 912 connected to a first drop sub-circuit 914—the path switching circuit 912 could be connected to either a first or second drop sub-circuit of a drop structure, or to either a first or second add sub-circuit of an add structure of a ROADM. Indeed, this is also be the case the for path switching circuits 212, 712, 812 discussed above in relation to FIGS. 2-8.

In the path switching circuit 912, the signal path 908 of the first drop sub-circuit 914 is coupled from the first input/output 904 to a first optical switch 918. and the path is directed from there to a second optical switch 920. From the second optical switch 920, the path is directed back to the signal path 908 to pass through the drop structure. At the end of the drop structure, the path is coupled to a third optical switch 926 and then to a SOA 910 via a first combiner 922. The SOA 910 is optically coupled to a second splitter-combiner 924, which directs the path to a fourth optical switch 928. From the fourth optical switch 928, the path rejoins the signal path 908 and passes towards the second input/output 906.

In this way, a first polarization component signal from the first input/output 904 on the signal path 908 will be directed to port a of the first switch 918. The signal will leave the first switch 918 and pass into port b of the second switch 920. The signal will leave the second switch 920 at port d and return to the signal path 908 for processing in the drop structure. After being processed in the drop structure, the signal will be directed from the signal path 908 to port n of the third switch 926. The signal will leave the third switch 926 at port h and pass to the SOA 910 via the first combiner 922. From the SOA 910, the signal will pass into port e of the second splitter-combiner 924 and leave at port g. The signal will then pass to the fourth switch 928 and, from port p, back to the signal path 908 towards the second input/output 906.

For a signal propagating in the second direction, from the second input/output 906 to the first input/output 904, the signal path 908 will be redirected to port p of the fourth switch 928. The signal will then pass to port m of the third switch 926 and leave the switch at port n. From there, the signal will return to the signal path 908 for processing in the drop structure. After being processed in the drop structure, the signal will be directed from the signal path 908 to port d of the second switch 920. The signal will leave the second switch 920 at port c and pass to the SOA 910 via the first combiner 922. From the SOA 910, the signal will pass into port e of the second splitter-combiner 924 and leave at port f. The signal will then pass to the first switch 918 and, from port a, back to the signal path 908 towards the first input/output 904.

Figure 1:
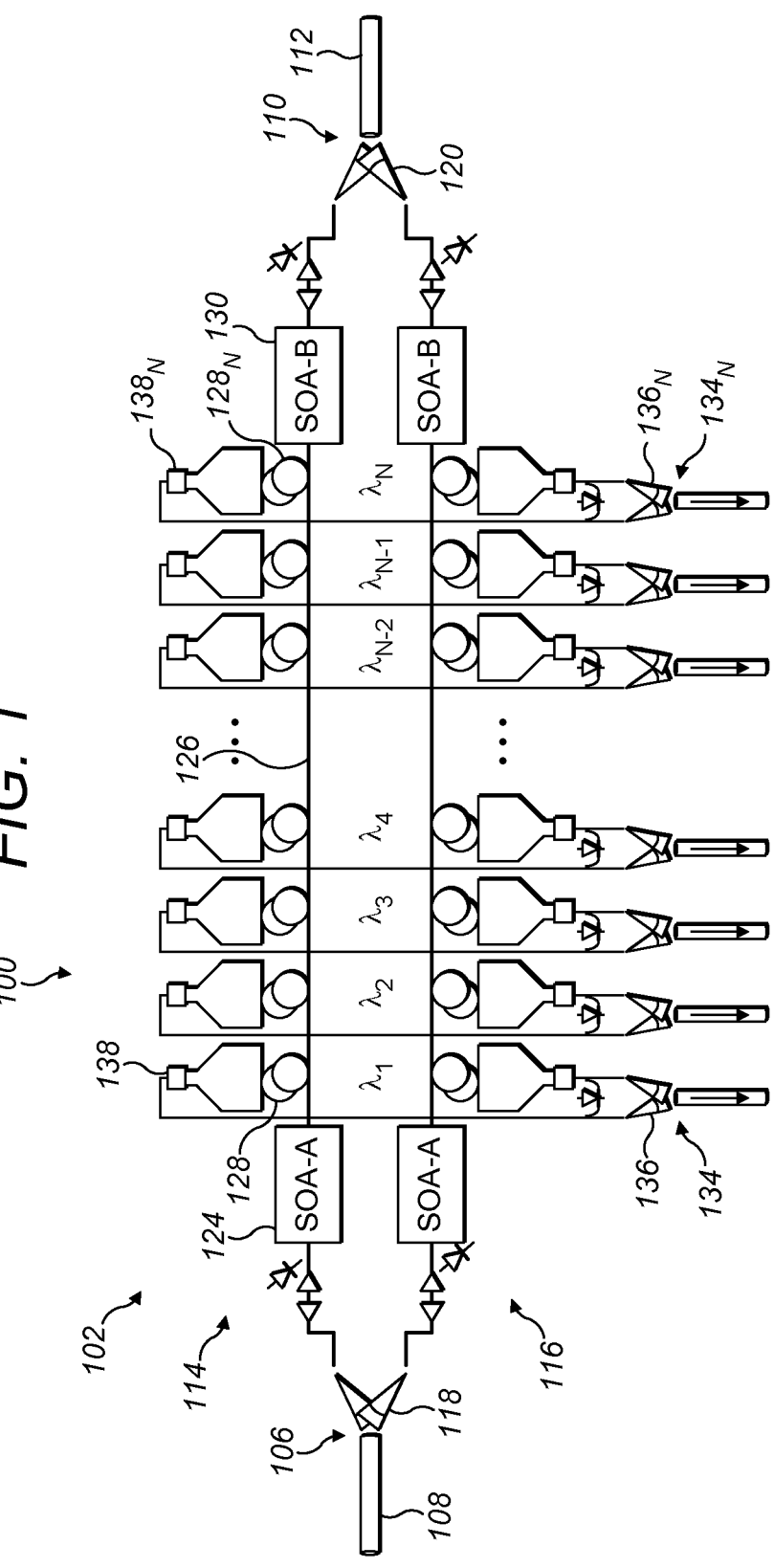
FIG. 1 schematically shows a known reconfigurable optical add/drop multiplexer.
Figure 1:
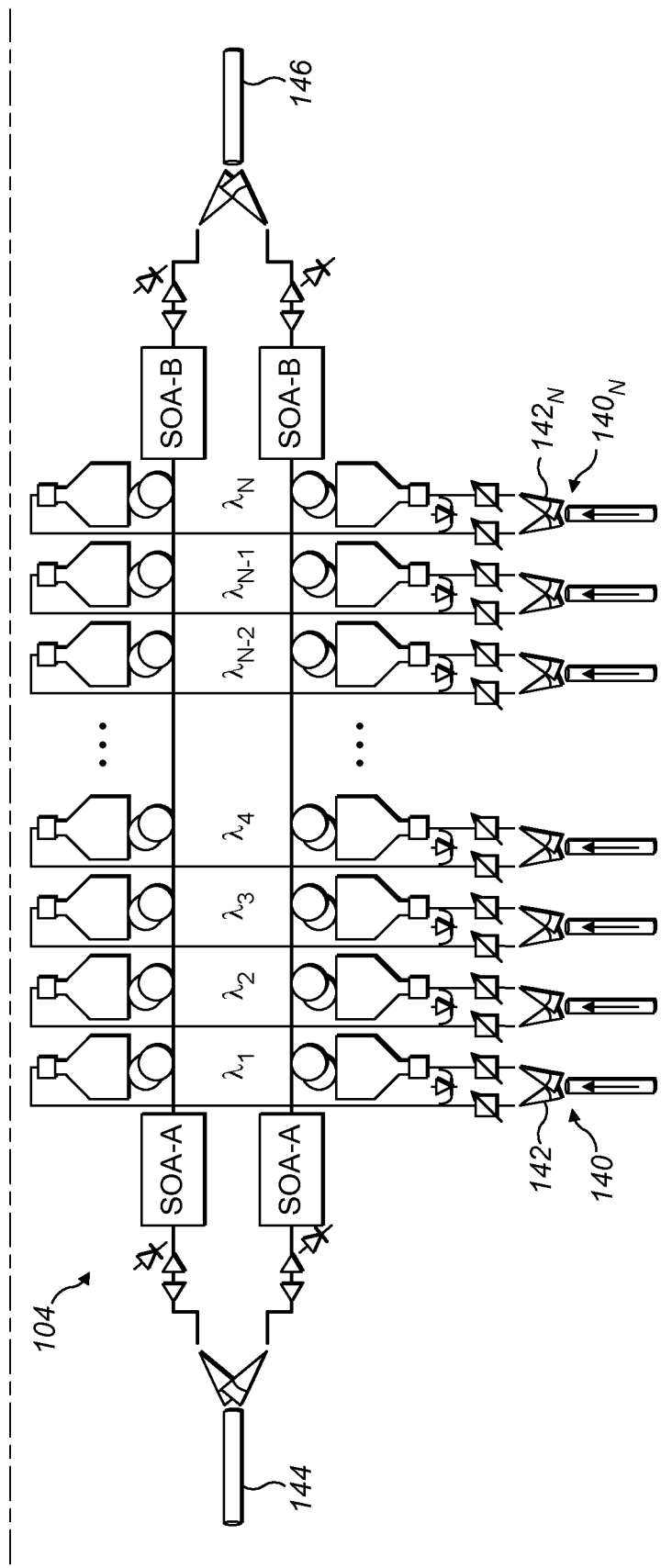

It can be seen, then, that configuring a path switching circuit with an optical gain element as described may provide the advantage of reducing the number of optical gain elements in a device. When applied to a ROADM, having first and second polarization drop sub-circuits and first and second polarization add sub-circuits as shown in FIG. 1, with a respective path switching circuit and optical gain element for each add or drop sub-circuit, the number of SOAs integrated into the ROADM silicon photonic device may be reduced from eight down to four. This offers a significant saving on cost and manufacturing complexity.

Figure 10:
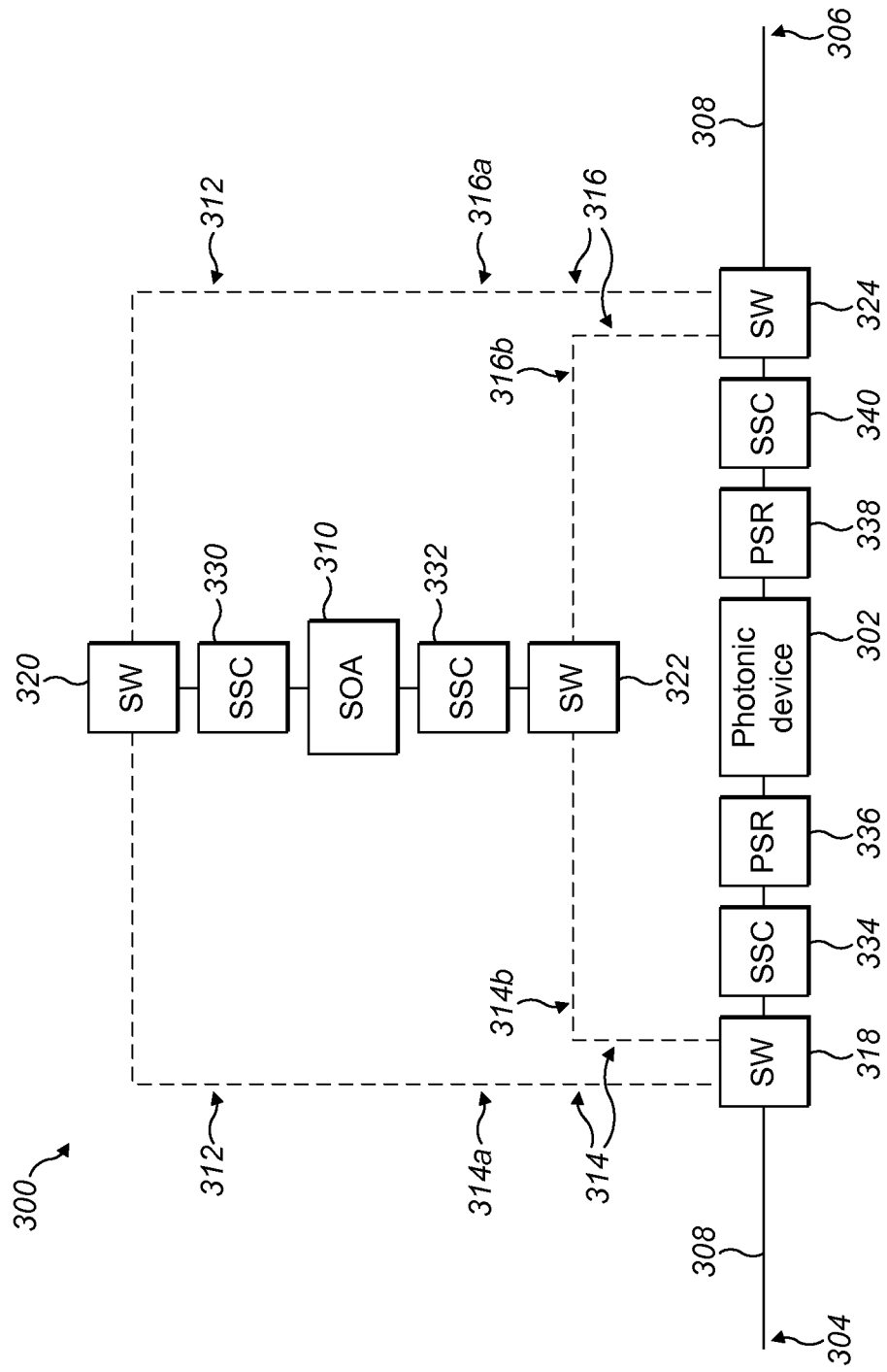
FIG. 10 schematically shows a polarization-insensitive amplification configuration in accordance with a further embodiment.

The devices shown in FIGS. 7-9 may be configured with a respective path switching circuit and optical gain element for each add or drop polarization sub-circuit. This arrangement would provide two path switching circuits and two optical gain elements per add or drop structure. The embodiment shown in FIG. 10 provides an arrangement in which a single path switching circuit and a single optical gain element may be configured for amplification of optical signals passing to or from both polarization sub-circuits of either an add structure or a drop structure, as a whole. More generally, the path switching circuit and optical gain element are configured outside of the polarization-sensitive zone of the device. This arrangement provides for amplification of the optical signal with the optical signal having an unknown and/or random polarization state, before the optical signal is processed by a polarization splitter-rotator to separate the signal into polarization components. In this way, a single path switching circuit and optical gain element may be configured to provide amplification to a polarization-sensitive photonic device as a whole and not only on a single polarization component of the photonic device. When applied to a ROADM, having first and second polarization drop sub-circuits and first and second polarization add sub-circuits as shown in FIG. 1, with a respective polarization-insensitive path switching circuit and optical gain element for the add structure and the drop structure, the number of SOAs integrated with the ROADM silicon photonic device may be reduced from eight down to two. This offers a significant saving on cost and manufacturing complexity.

Referring to FIG. 10, there is shown a device 300 for processing an optical signal. The device 300 includes a polarization-sensitive photonic device 302 arranged between a first input/output 304 and a second input/output 306. The photonic device 300 is in optical communication with the first and second inputs/outputs 304,306 by a signal path 308. The signal path 308 may be configured for transmission of a first optical signal in a first direction from the first input/output 304 to the second input/output 306. The signal path 308 may alternatively be configured for transmission of a second optical signal in a second direction from the second input/output 306 to the first input/output 304. The polarization-sensitive photonic device 302 is configured between a first polarization splitter-rotator (PSR) 336 and a second polarization splitter-rotator (PSR) 338. The region of the device 300 between the first and second PSRs 336,338, including the photonic device 302, may therefore be considered to be a polarization-sensitive region or zone.

The device 300 also includes a polarization-insensitive optical gain element for receiving the first or second optical signal and outputting an amplified first or second optical signal, respectively, outside of the polarization-sensitive region. In this embodiment, the polarization-insensitive optical gain element is provided as a polarization-insensitive semiconductor optical amplifier 310. A polarization-insensitive SOA typically exhibits a low polarization-dependent gain. Such polarization-independent SOAs are known.

The device 300 also includes a polarization-insensitive path switching circuit 312, also configured outside of the polarization-sensitive region. The path switching circuit 312 provides a first signal amplification path 314 connectable between the first input/output 304 and the first PSR 336 for optically coupling the signal path 308 to and from the SOA 310. The path switching circuit 312 further provides a second signal amplification path 316 connectable between the second PSR 338 and the second input/output 306 for optically coupling the signal path 308 to and from the SOA 310. The path switching circuit 312 is arranged to selectively connect the first signal amplification path 314 or the second signal amplification path 316 into the signal path 308.

In this embodiment, the first signal amplification path 314 is includes a first signal amplification sub-path 314a and a second signal amplification sub-path 314b. The first signal amplification path 314 is optically coupled to a first switching element 318, a second switching element 320, and a third switching element 322. The first switching element 318 is provided on the signal path 308 between the first input/output 304 and the first PSR 336. The first switching element 318 may be configured to connect the signal path 308 to the first signal amplification sub-path 314a. The first switching element 318 is coupled to the second switching element 320 by the first signal amplification sub-path 314a. The second switching element 320 is coupled to the SOA 310 via a first spot-size converter (SSC) 330. The first spot-size converter 330 is a polarization-insensitive spot-size converter and is configured to convert a first propagation mode size of the optical signal from the first signal amplification sub-path 314a to a second mode size of the SOA 310. The SOA 310 is coupled to the third switching element 322 via a second spot-size converter (SSC) 332. The second spot-size converter 332 is a polarization-insensitive spot-size converter and is configured to convert the second propagation mode size of the optical signal from the SOA 310 to a third mode size of the first signal amplification sub-path 314b. The first and third mode sizes may be configured to match, so that the first and second spot-size converters 330,332 may also match, but in opposite configurations. This can simplify fabrication processes. The first and third mode sizes may also be configured to correspond to a propagation mode size of incoming/outgoing optical signals from/to external optical fibers (not shown) to which the device 300 may be coupled. Alternatively, the signal path 308 and the first and second signal amplification paths 314,316 may have the same spot-size, so that the first and third spot sizes match, but do not correspond to that of an external optical fiber. In this case, a further spot-size converter (not shown) may be provided between an external optical fiber (not shown) and the signal path 308.

The third switching element 322 is coupled back to the first switching element 318 by the first signal amplification sub-path 314b. In this way, the path switching circuit 312 may be configured to divert optical signals received from the signal path 308, from either the first or second direction, away from the signal path 308 onto the first signal amplification path 314, to the SOA 310 and then back to the signal path 308 from the SOA 310, for onward transmission on the signal path 308. This may be performed in a polarization-insensitive manner. In the first direction, the optical signals would then pass into the polarization-sensitive region to the photonic device 302, while, in the second direction, the optical signals would pass to the first input/output 304.

For transmission of the optical signal from the first switching element 318 to the first PSR 336 and to the photonic device 302, a third spot-size converter 334 is provided to convert the first or third propagation mode size to a mode size for coupling into the polarization-sensitive region. For example, the third spot-size converter 334 may be configured to convert the first or third propagation mode size to a fourth mode size of a silicon optical waveguide structure.

In this embodiment, the second signal amplification path 316 includes a second signal amplification sub-path 316a and a second signal amplification sub-path 316b. The second signal amplification path 316 is optically coupled to a fourth switching element 324, the second switching element 320, and the third switching element 322. The fourth switching element 324 is provided on the signal path 308 between the second input/output 306 and the second PSR 338. The fourth switching element 324 may be configured to connect the signal path 308 to the second signal amplification sub-path 316a. The fourth switching element 324 is coupled to the second switching element 320 by the second signal amplification sub-path 316a. The second switching element 320 is coupled to the SOA 310 via the first spot-size converter 330. The SOA 310 is coupled to the third switching element 322 via the second spot-size converter 332. The third switching element 322 is coupled back to the fourth switching element 324 by the second signal amplification sub-path 316b. In this way, the path switching circuit 312 may be configured to divert optical signals received from the signal path 308, from either the first or second direction, away from the signal path 308 onto the second signal amplification path 316, to the SOA 310 and then back to the signal path 308 from the SOA 310, for onward transmission on the signal path 308. This may be performed in a polarization-insensitive manner. In the second direction, the optical signals would then pass into the polarization-sensitive region to the photonic device 302, while, in the first direction, the optical signals would pass to the second input/output 306.

For transmission of the optical signal from the fourth switching element 324 to the second PSR 338 and to the photonic device 302, a fourth spot-size converter 340 is provided to convert the first or third propagation mode size to a mode size for coupling into the polarization-sensitive region. For example, the fourth spot-size converter 340 may be configured to convert the first or third propagation mode size to a fourth mode size of a silicon optical waveguide structure.

The polarization-insensitive path switching circuit 312 and SSCs 330,332,334,340 may be formed from materials, or combinations of materials, including silicon dioxide ($SiO_2$), silicon oxide (SiOx), silicon oxynitride (SiON or $SiO_xN_y$) and/or silicon nitride ($Si_3N_4$), among others. Such materials are also compatible with CMOS fabrication processes, so the polarization-insensitive path switching circuit may be integrated on a silicon photonics substrate along with the polarization-sensitive photonic device.

Although the path switching circuit and optical gain element in this embodiment are polarization-insensitive and spot-size converters are additionally configured in the path switching circuit, the general discussion of operational modes for optical amplification provided in respect of FIGS. 2-6 also applies to the device 300, with the SSCs and PSRs performing their respective functions on optical signals as the optical signals pass through those elements in the relevant active path for a given operational mode, as discussed above.

Figure 11:
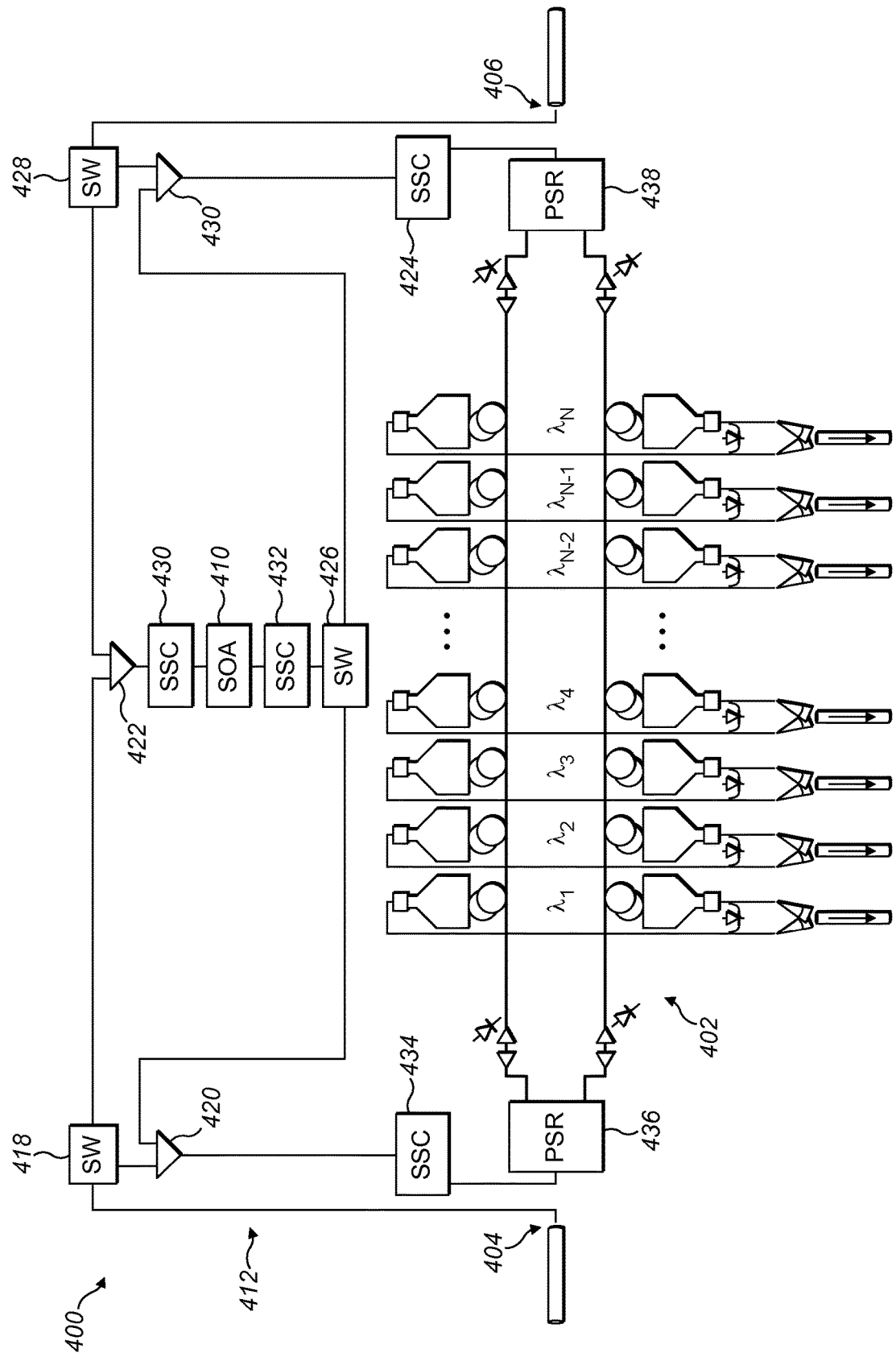
FIG. 11 schematically shows a polarization-insensitive amplification configuration in accordance with a further embodiment.

FIG. 11 shows an embodiment of a polarization-insensitive path switching circuit 412 configured with a polarization-sensitive photonic device, which in this embodiment is provided as a drop structure 402 of a ROADM. The drop structure 402 is provided between a first PSR 436 and a second PSR 438, representing a polarization-sensitive region of the device 400.

The device 400 includes a polarization-insensitive optical gain element for receiving an optical signal and outputting an amplified optical signal, outside of the polarization-sensitive region. In this embodiment, the polarization-insensitive optical gain element is provided as a polarization-insensitive semiconductor optical amplifier 410.

The device 400 also includes a polarization-insensitive path switching circuit 412, also configured outside of the polarization-sensitive region. The path switching circuit 412 provides a first signal amplification path connectable between a first input/output 404 and the first PSR 436 for optically coupling the signal path to and from the SOA 410. The path switching circuit 412 further provides a second signal amplification path connectable between the second PSR 438 and the second input/output 406 for optically coupling the signal path to and from the SOA 410. The path switching circuit 412 is arranged to selectively connect the first signal amplification path or the second signal amplification path into the signal path.

In this embodiment, the path switching circuit 412 is provided by a combination of optical switches and splitter-combiners. The switches in this embodiment may be provided by 1×2 optical switches. The path switching circuit 412 is configured for providing optical amplification at the input end, or upstream of the polarization-sensitive zone—in this embodiment, the drop structure 402—in either direction of propagation.

In the path switching circuit 412, the signal path is coupled from the first input/output 404 to a first optical switch 418. The path is directed from there to a SOA 410 via a first combiner 422 and a first spot-size converter (SSC) 430. The SOA 410 is optically coupled to a second switch 426 via a second SSC 432. The second switch 426 couples the path to a second combiner 420. From the second combiner 420, the path couples to a third SSC 434 for converting a propagation mode size to that of the polarization-sensitive region. From the third SSC 434, the path passes to the first PSR 436 and into the polarization-sensitive region including the drop structure 402. At the end of the drop structure 402, the path passes to the second PSR 438 and to a fourth SSC 424 for converting the propagation mode size of the polarization-sensitive region to that of the polarization-insensitive region.

In this way, a first signal with a generic or random polarization from the first input/output 404 on the signal path will be directed to the first switch 418. The signal will leave the first switch 418 and pass into the first combiner 422 to the SOA 410, via the first SSC 430. From the SOA 410, the signal will pass via the second SSC 432, to the second switch 426. The signal will then pass into the second combiner 420 and back to the main signal path for processing in the polarization-sensitive drop structure 402, via the first PSR 436. After being processed in the drop structure 402, the signal will pass to the second PSR 438, and leave the polarization-sensitive region. The signal will be directed via the fourth SSC 424 and then to the third splitter-combiner 430. The third splitter-combiner 430 passes the signal to the third switch 428. The signal leaves the third switch 428 and returns to the signal path towards the second input/output 406.

For a signal propagating in the second direction, from the second input/output 406 to the first input/output 404, the signal path will be directed to the third switch 428. The signal will leave the third switch 428 and pass into the first combiner 422 to the SOA 410, via the first SSC 430. From the SOA 410, the signal will pass to the second switch 426, via the second SSC 432. The signal will then pass into the third splitter-combiner 430 and, via the fourth SSC 424, back to the signal path for processing in the polarization-sensitive drop structure 402, via the second PSR 438. After being processed in the drop structure 402, the signal will pass to the first PSR 436, and leave the polarization-sensitive region. The signal will be directed via the third SSC 434 and then to the first splitter-combiner 420. The first splitter-combiner 420 passes the signal to the first switch 418. The signal leaves the first switch 418 and returns to the signal path towards the first input/output 404.

As stated above, the path switching circuits of the above embodiments may be connected to either an add structure of a ROADM or to a drop structure of a ROADM. For embodiments in which the path switching is polarization-independent and takes place outside of the polarization-sensitive region of a ROADM, a path switching circuit may be coupled to the add structure; or a path switching circuit may be coupled to the drop structure; or one path switching circuit may be coupled to the add structure and another path switching circuit may be coupled to the drop structure. For embodiments in which the path switching takes place inside the polarization-sensitive region of a ROADM, a path switching circuit may be connected to either a first or second drop sub-circuit of a drop structure, or to a first or second add sub-circuit of an add structure of a ROADM. Alternatively, a first path switching circuit may be connected to a first drop sub-circuit of a drop structure and a second path switching circuit may be connected to a second drop sub-circuit of the drop structure. Alternatively still, a first path switching circuit may be connected to a first add sub-circuit of an add structure and a second path switching circuit may be connected to a second add sub-circuit of the add structure. Alternatively still, a respective path switching circuit may be connected to each of the first and second drop sub-circuits of the drop structure and to each of the first and second add sub-circuits of the add structure. It will be appreciated therefore that, while the embodiments shown in FIGS. 7-9 and 11 include a photonic device in the form of a drop structure of a ROADM, the photonic device may alternatively be provided in the form of an add structure of a ROADM, with the details of the path switching circuits and optical gain elements remaining unchanged. Similarly, while the embodiment shown in FIG. 14, below, includes a photonic device in the form of an add structure of a ROADM, the photonic device may alternatively be provided in the form of a drop structure of a ROADM, with the details of the signal amplification paths and optical gain elements remaining unchanged.

Figure 12:
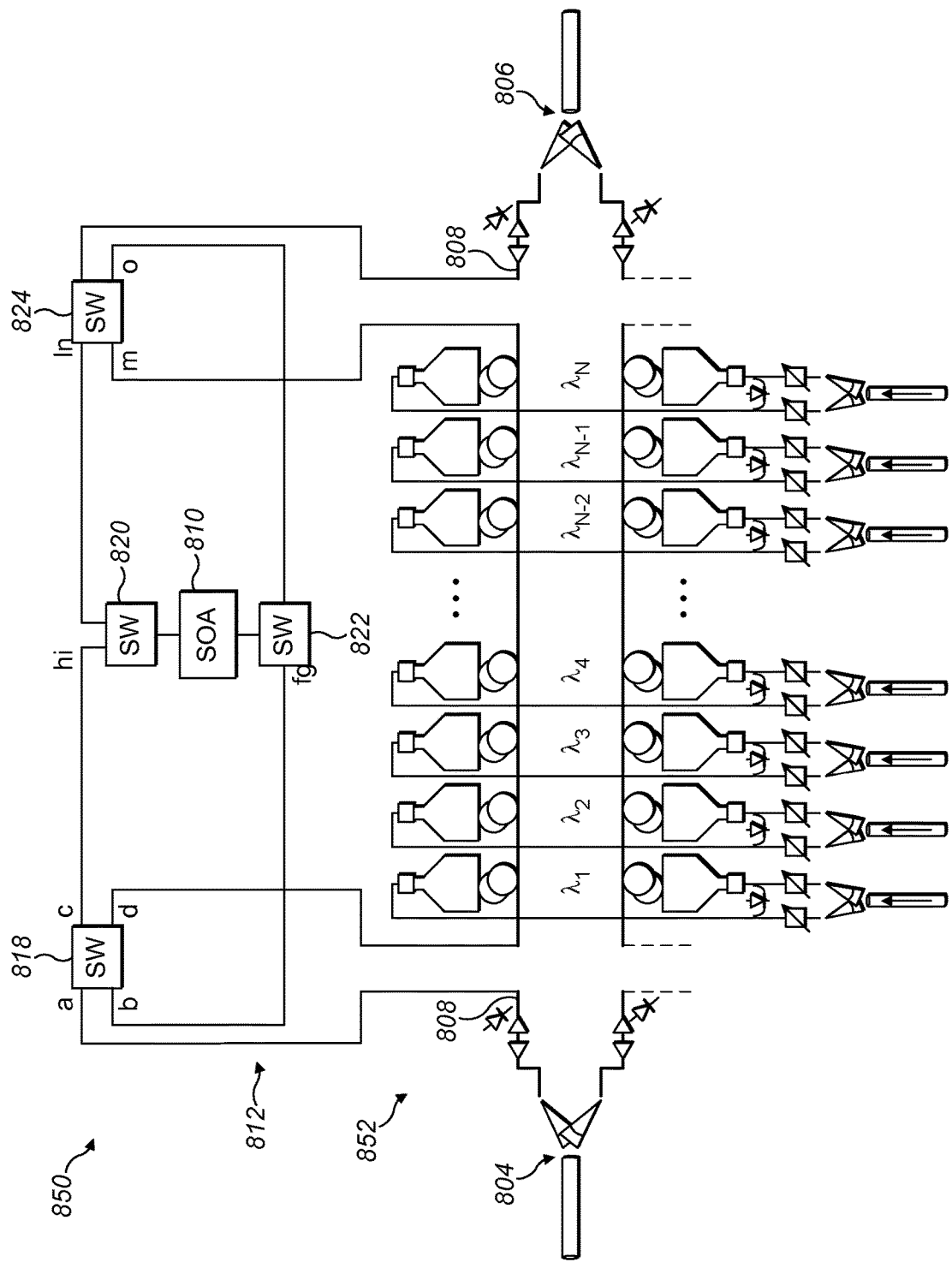
FIG. 12 schematically shows an add circuit of a ROADM in accordance with a further embodiment.

By way of example, FIG. 12 shows an embodiment of a device 850, in which the photonic device is provided as an add circuit structure 852 of a ROADM. The structure is polarization-sensitive and the add circuit structure 852 is split into a first add sub-circuit for processing a first polarization component signal and a second add sub-circuit for processing a second polarization component signal. A path switching circuit 812 is connected to the first add sub-circuit. A second path switching circuit may also in some embodiments be connected to the second add sub-circuit. However, for simplicity of explanation, a second path switching circuit is not shown in FIG. 12. The description of the path switching circuit 812 for the first add sub-circuit will be understood to apply in an analogous manner to a second path switching circuit for the second add sub-circuit.

In this embodiment, the path switching circuit 812 is arranged and configured to function in exactly the same way as the path switching circuit 812 shown in the embodiment of FIG. 8, so a description of the layout and operation of the path switching circuit 812 is not repeated here. It will be understood that such a description of the embodiment of FIG. 12 would differ from that provided in respect of FIG. 8 in that references to the drop structure and the drop circuit structure 802 would be replaced with references to the add structure and the add circuit structure 852, respectively.

Figure 13:
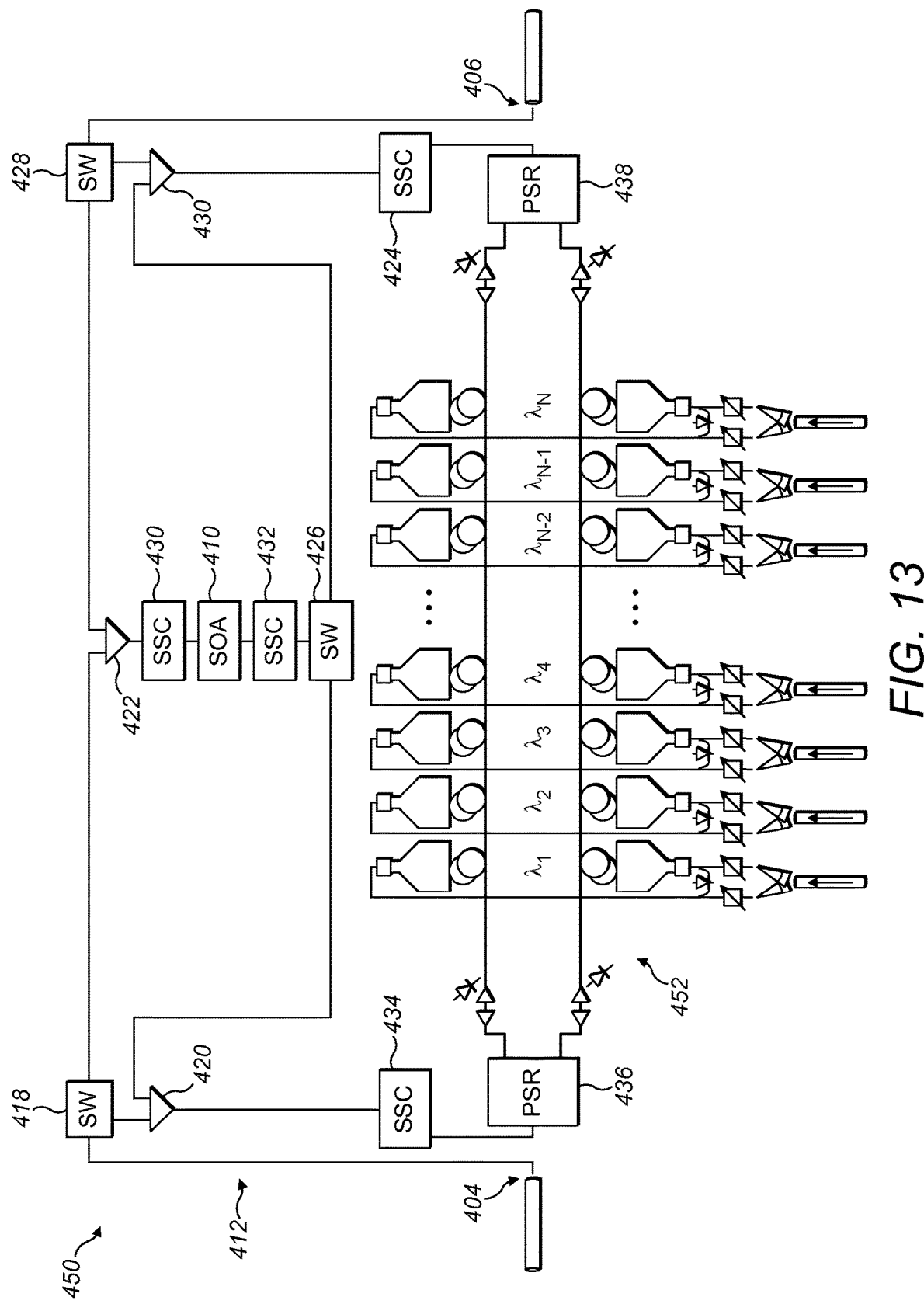
FIG. 13 schematically shows an add circuit of a ROADM in accordance with a further embodiment.

By way of further example, FIG. 13 shows an embodiment of a device 450, in which a polarization-insensitive path switching circuit 412 is configured with a polarization-sensitive photonic device, which in this embodiment is provided as an add structure 452 of a ROADM. The add structure 452 is provided between a first PSR 436 and a second PSR 438, representing a polarization-sensitive region of the device 450.

In this embodiment, the polarization-insensitive path switching circuit 412 is arranged and configured to function in exactly the same way as the polarization-insensitive path switching circuit 412 shown in the embodiment of FIG. 11, so a description of the layout and operation of the polarization-insensitive path switching circuit 412 is not repeated here. It will be understood that such a description of the embodiment of FIG. 13 would differ from that provided in respect of FIG. 11 in that references to the drop structure 402 would be replaced with references to the add structure 452.

In the above embodiments, a path switching circuit has been arranged to selectively engage or connect an optical gain element into the active path of a device, either upstream of a photonic device or downstream of the photonic device. The path switching circuit includes a first signal amplification path connectable between the first input/output and the photonic device and a second signal amplification path connectable between the photonic device and a second input/output. The path switching circuit is configured to selectively engage or connect the first or the second signal amplification path into the active path. Both the first and second signal amplification paths are optically coupled to the same optical gain element, so that whichever path is engaged the active path will pass through the optical gain element. In the embodiments shown in FIGS. 10, 11, and 13, the first and second signal amplification paths are provided outside of a polarization-sensitive region of the device; that is, outside of, or external to, a polarization-sensitive photonic device and a respective PSR either side of the photonic device.

Figure 14:
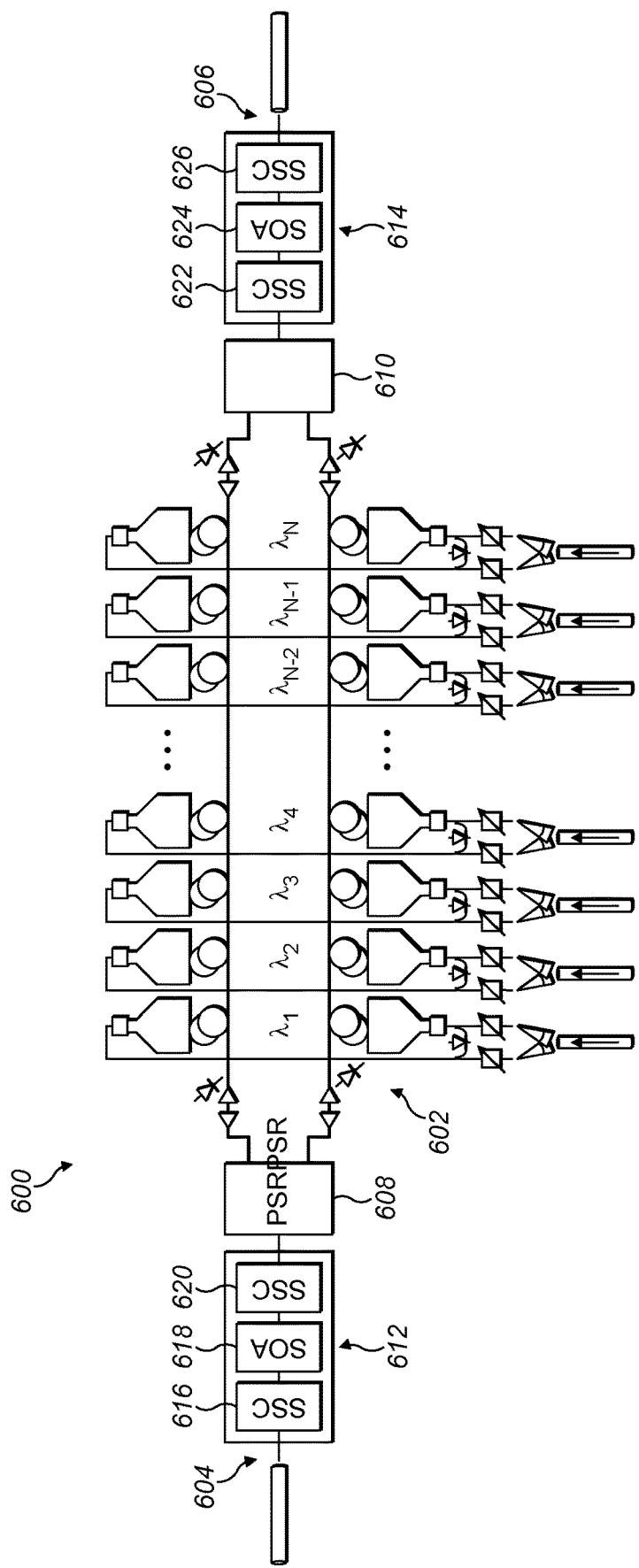
FIG. 14 schematically shows a polarization-insensitive amplification configuration in accordance with a further embodiment.

FIG. 14 shows an embodiment of a device 600 having a polarization-insensitive amplification configuration arranged outside of a polarization-sensitive region of the device. In this embodiment, the polarization-sensitive region of the device 600 includes a polarization-sensitive photonic device 602—here, in the form of an add structure 602 of a ROADM—optically coupled between a first PSR 608 and a second PSR 610. A first polarization-insensitive optical gain element coupling device 612 is optically coupled between a first input/output 604 of the device and the first PSR 608. A second polarization-insensitive optical gain element coupling device 614 is optically coupled between the second PSR 610 and a second input/output 606 of the device.

The first optical gain element coupling device 612 includes a first polarization-insensitive optical gain element, in this embodiment provided by a polarization-insensitive first SOA 618. The first SOA 618 is optically coupled between a polarization-insensitive first SSC 616 and a polarization-insensitive second SSC 620, for spot-size conversion of optical signals between the first input/output 604 and the first SOA 618, and between the first SOA 618 and the first PSR 608, respectively. The second optical gain element coupling device 614 includes a second polarization-insensitive optical gain element, in this embodiment provided by a polarization-insensitive second SOA 624. The second SOA 624 is optically coupled between a polarization-insensitive third SSC 622 and a polarization-insensitive fourth SSC 626, for spot-size conversion of optical signals between the second PSR 610 and the second SOA 624, and between the second SOA 624 and the second input/output 606, respectively. In some embodiments, the first and fourth SSCs 616, 626 may be identical but arranged in opposite configurations. Similarly, the second and third SSCs 620, 622 may be identical but arranged in opposite configurations.

The first optical gain element coupling device 612—in particular, the first SOA 618—is selectively engageable or configurable either to optically amplify optical signals passing in either direction between the first input/output 604 and the first PSR 608, or to allow such optical signals to pass between the first input/output 604 and the first PSR 608 without actively amplifying the optical signals. When the first optical gain element coupling device 612 is selectively engaged to optically amplify optical signals, the first optical gain element coupling device 612 is considered to provide a first signal amplification path connected between the first input/output 604 and the first PSR 608. When the first optical gain element coupling device 612 is selectively engaged to allow optical signals to pass without amplification, the first optical gain element coupling device 612 is considered simply to provide a portion of the signal path for the optical signals.

The second optical gain element coupling device 614—in particular, the second SOA 624—is selectively engageable or configurable either to optically amplify optical signals passing in either direction between the second PSR 610 and the second input/output 606, or to allow such optical signals to pass between the second PSR 610 and the second input/output 606 without actively amplifying the optical signals. When the second optical gain element coupling device 614 is selectively engaged to optically amplify optical signals, the second optical gain element coupling device 614 is considered to provide a second signal amplification path connected between the second PSR 610 and the second input/output 606. When the second optical gain element coupling device 614 is selectively engaged to allow optical signals to pass without amplification, the second optical gain element coupling device 614 is considered simply to provide a portion of the signal path for the optical signals.

In this way, for providing optical amplification to optical signals passing in either direction between the first input/output 604 and the first PSR 608, the first optical gain element coupling device 612 may be selectively engaged to connect the first signal amplification path into the signal path of the device 600, such that the first SOA 618 may provide optical amplification to the optical signals. The second optical gain element coupling device 614 may in this case be selectively configured to provide a portion of the signal path without optical amplification. For providing optical amplification to optical signals passing in either direction between the second PSR 610 and the second input/output 606, the second optical gain element coupling device 614 may be selectively engaged to connect the second signal amplification path into the signal path of the device 600, such that the second SOA 624 may provide optical amplification to the optical signals. The first optical gain element coupling device 612 may in this case be selectively configured to provide a portion of the signal path without optical amplification. Alternatively, in some embodiments, both the first and second optical gain element coupling devices 612, 614 may be selectively engaged to connect the first and second signal amplification paths into the signal path of the device 600, such that both the first and second SOAs 618, 624 may provide optical amplification to the optical signals.

With the embodiment of FIG. 14, it can be seen that two optical gain elements may be configured to be selectively connected to either an add structure or a drop structure of a ROADM. Implementing the embodiment of FIG. 14 with both an add structure and a drop structure of a ROADM would involve the provision of four optical gain elements, compared with the eight SOAs of the ROADM of FIG. 1. This embodiment therefore offers the advantage of significant savings in manufacturing complexity and cost.

FIG. 15A shows a side view and FIG. 15B shows a top view of a further embodiment of a device 630 having a polarization-insensitive amplification configuration arranged outside of a polarization-sensitive region of the device. The arrangement shown in FIGS. 15A,B may be employed in the device 600 of FIG. 14, among others.

In this embodiment, the polarization-sensitive region of the device 630 includes a polarization-sensitive photonic device 632 optically coupled between a first PSR 636 and a second PSR 638, provided on a SOI substrate 634. In this embodiment, the first and second PSRs 636,638 are provided by a respective dual polarization grating coupler (DPGC). The polarization-sensitive photonic device 632 may therefore be implemented with a polarization diversity scheme, providing separate polarization component paths through the photonic device.

A first polarization-insensitive optical gain element coupling device 640 is optically coupled between a first input/output of the device and the first PSR 636. A second polarization-insensitive optical gain element coupling device 642 is optically coupled between the second PSR 638 and a second input/output of the device. The first optical gain element coupling device 640 includes a first polarization-insensitive optical gain element, in this embodiment provided by a polarization-insensitive first SOA 646. The first SOA 646 is optically coupled between a polarization-insensitive first SSC 644 and a polarization-insensitive second SSC 648, for spot-size conversion of optical signals between the first input/output and the first SOA 646, and between the first SOA 646 and the first PSR 636, respectively. The second optical gain element coupling device 642 includes a second polarization-insensitive optical gain element, in this embodiment provided by a polarization-insensitive second SOA 654. The second SOA 654 is optically coupled between a polarization-insensitive third SSC 652 and a polarization-insensitive fourth SSC 656, for spot-size conversion of optical signals between the second PSR 638 and the second SOA 654, and between the second SOA 654 and the second input/output, respectively.

Optical signals generally need to be coupled into a DPGC vertically. Accordingly, the first and second DPGCs 636,638 are provided at a level vertically separated from the first and second optical gain element coupling devices 640,642. The second SSC 648 is provided with a mirror 650 configured provide horizontal-to-vertical coupling from the first optical gain element coupling device 640 to the DPGC 636, and vice versa. Similarly, the third SSC 652 is provided with a mirror 658 configured provide vertical-to-horizontal coupling from the second DPGC 638 to the second optical gain element coupling device 642, and vice versa. Of course, references to horizontal and vertical dimensions here are made for convenience of explanation, but do not indicate a specific alignment to any particular external frame of reference.

The first SSC 644 may be arranged to convert a first spot-size of, for example, an optical fiber input (for example of a diameter of 9 microns), to a second spot-size of the first SOA 646 (for example of a diameter of 3 microns). The second SSC 648 may be arranged to convert the second spot-size of the first SOA 646 to a third spot-size (for example of a diameter of 9 microns) for coupling into the photonic device 632 through the first DPGC 636. The third SSC 652 may be arranged to convert the third spot-size (for example of a diameter of 9 microns) from the photonic device 632 through the second DPGC 638 back to the second spot-size of the second SOA 654 (for example of a diameter of 3 microns). The fourth SSC 656 may be arranged to convert the second spot-size of the second SOA 654 back to the first spot-size of, for example, an optical fiber output (for example of a diameter of 9 microns).

To facilitate the provision of suitable dimensions to the components of the device 630, the materials used for the SSCs may be different from the materials used for the SOAs and different from the materials used for the polarization-sensitive photonic device. If the polarization-sensitive device is realized in silicon and the SOAs are realized in InP, a suitable material for the SSCs includes silicon nitride ($Si_3N_4$), but other materials may alternatively be used.

With this arrangement, the SSCs, mirrors, DPGCs, and photonic device may be fabricated using CMOS processes, thereby offering a convenient and cost-effective manufacturing procedure.

FIG. 16A shows a side view and FIG. 16B shows a top view of an embodiment of a polarization-insensitive optical gain element coupling device 660. The optical gain element coupling device 660 may be implemented as the first optical gain element coupling device 640 of the embodiment of FIGS. 15A,B. With the arrangement reversed, the optical gain element coupling device 660 may also be implemented as the second optical gain element coupling device 642 of the embodiment of FIGS. 15A,B.

The optical gain element coupling device 660 is shown provided on a SOI substrate 634. The SOI substrate 634 includes a DPGC; for example, the DPGC 636 of the embodiment of FIGS. 15A,B.

The optical gain element coupling device 660 includes a first polarization-insensitive optical gain element, in this embodiment provided by a polarization-insensitive first SOA 646. The first SOA 646 is optically coupled between a polarization-insensitive first SSC 644 and a polarization-insensitive second SSC 648, for spot-size conversion of optical signals between the first input/output and the first SOA 646, and between the first SOA 646 and the DPGC 636, respectively.

The polarization-insensitive first SSC 644 includes a first coupling element 662 and a second coupling element 664. The polarization-insensitive second SSC 648 includes a third coupling element 666 and a fourth coupling element 668.

In this embodiment, the first and second coupling elements 662,664 are configured as inverted tapers for spot-size conversion of light into the SOA 646; in particular, in applications where light is received into the device from an optical fiber input. The first coupling element 662 tapers inwardly in a direction towards the first SOA 646 and couples to the second coupling element 664 which tapers outwardly in the direction towards the first SOA 646. At the coupling region between the first and second coupling elements 662,664, the first coupling element 662 is provided on top of the second coupling element 664. The mode size, or spot-size, is gradually contracted in the tapering top layer and at the same time optical power is conveyed along the gradually widening taper in the bottom layer. The coupling may be achieved by changing the respective waveguide cross-sections gradually along the propagation direction of the light, such that the optical power remains in a single eigenmode of the composite waveguide, while coupling to other modes is suppressed. In the narrowing taper of the first coupling element 662 in the top layer, it is desirable to prevent the mode going to cut-off. In the widening taper of the second coupling element 664 in the lower layer, it is desirable to prevent high-order modes from appearing.

In this embodiment, the first coupling element 662 may be formed from silicon oxynitride (SiON or $SiO_xN_y$). The second coupling element 664 may be formed from silicon nitride (Si$_3$N$_4$). The SOA 646 may be formed from indium phosphide (InP). Silicon nitride and silicon oxynitride are CMOS fabrication-compatible, like silicon, although they are generally formed as larger waveguides, with larger cross sections compared to silicon. This can be advantageous for providing optical coupling between an integrated device and an optical fiber. Using silicon nitride, it is relatively straightforward to realize a polarization-insensitive mode converter which may adapt the spot-size of an optical fiber to that of a SOA, which is smaller. Also, the SOA is configured to be polarization-insensitive, so the SOA may be arranged close to the interface with an optical fiber, thereby saving the number of active gain blocks, or optical gain elements, within the integrated device.

In this embodiment, between the first SOA 646 and the mirror 650 and the DPGC 636, the third and fourth coupling elements 666,668 are configured as inverted tapers for spot-size conversion of light from the SOA 646 to that of the downstream photonic device. The third and fourth coupling elements 666,668 may be configured in the reverse formation of the first and second coupling elements 662,664. In one embodiment, the dimensions of the third and fourth coupling elements 666,668 compared to those of the respective second and first coupling elements 664,662, and the resulting spot-sizes, are arranged to correspond. It will be appreciated, however, that the dimensions of the third and fourth coupling elements 666,668 compared to those of the first and second coupling elements 662,664, and the resulting spot-sizes, may not be identical for some applications.

The third coupling element 666 tapers outwardly in a direction away from the first SOA 646 and couples to the fourth coupling element 668 which tapers outwardly in a direction towards the mirror 650 and DPGC 636. At the coupling region between the third and fourth coupling elements 666,668, the fourth coupling element 668 is provided on top of the third coupling element 666. The mode size, or spot-size, is gradually contracted in the tapering bottom layer and at the same time optical power is conveyed along the gradually widening taper in the top layer.

In this embodiment, the third coupling element 666 may be formed from silicon nitride (Si$_3$N$_4$). The fourth coupling element 668 may be formed from silicon oxynitride (SiON or SiO$_x$N$_y$).

Figure 17:
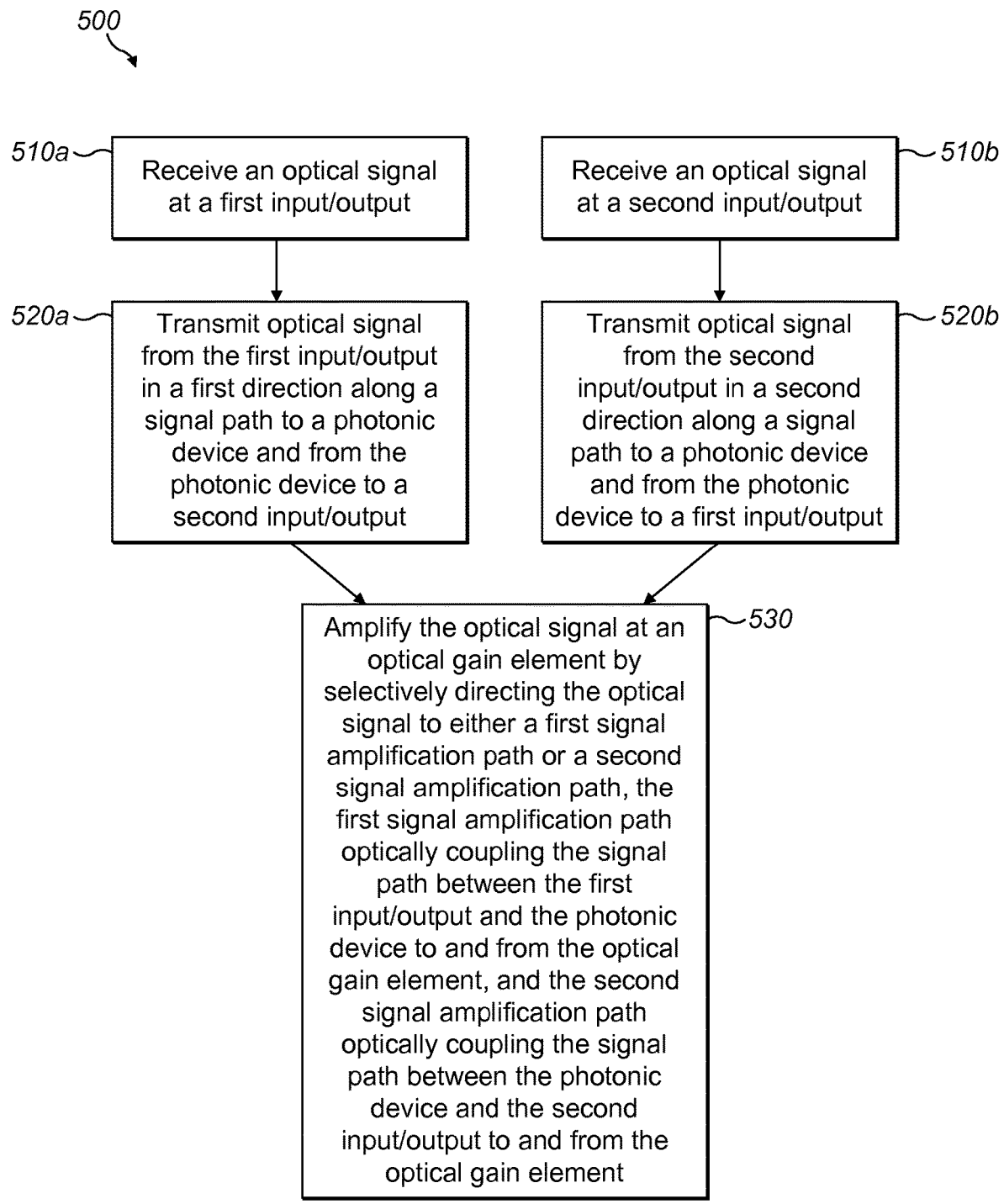
FIG. 17 shows a flowchart of a method for processing a signal in accordance with a further embodiment.

FIG. 17 shows a method 500 for processing an optical signal in accordance with one embodiment. The method 500 begins at either step 510*a* or step 510*b*, but not both at the same time. Beginning at step 510*a* includes receiving an optical signal at a first input/output. From step 510*a*, the method 500 proceeds to step 520*a*. Step 520*a* includes transmitting the optical signal from the first input/output in a first direction along a signal path to a photonic device and from the photonic device to a second input/output. Alternatively, beginning at step 510*b* includes receiving an optical signal at a second input/output. From step 510*b*, the method 500 proceeds to step 520*b*. Step 520*b* includes transmitting the optical signal from the second input/output in a second direction along a signal path to a photonic device and from the photonic device to a first input/output.

The optical signal may be received at either the first input/output or the second input/output, but optical signals may not be received as inputs at both the first and second inputs/outputs simultaneously. That is, when one of the first or second inputs/outputs functions as the optical signal input, the other of the first or second inputs/outputs functions as the optical signal output, and vice versa.

From either step 520*a* or step 520*b*, the method proceeds to common step 530. Step 530 includes amplifying the optical signal at an optical gain element by selectively directing the optical signal to either a first signal amplification path or a second signal amplification path, the first signal amplification path optically coupling the signal path between the first input/output and the photonic device to and from the optical gain element, and the second signal amplification path optically coupling the signal path between the photonic device and the second input/output to and from the optical gain element.

Other variations, modifications, and embodiments will be apparent to the skilled person and are intended to form part of the invention.

The invention claimed is:

1. A device for processing an optical signal, the device comprising:
   a photonic device arranged between a first input/output and a second input/output, the photonic device being in optical communication with the first and second inputs/outputs by a signal path, the signal path being selectively for transmission of a first optical signal in a first direction from the first input/output to the second input/output and for transmission of a second optical signal in a second direction from the second input/output to the first input/output;
   an optical gain element for receiving the first or second optical signal and outputting an amplified first or second optical signal respectively, the optical gain element being selectively configurable to optically amplify the first optical signal downstream of the photonic device in the first direction and the second optical signal downstream of the photonic device in the second direction; and
   a path switching circuit comprising:
      a first signal amplification path connectable between the first input/output and the photonic device for optically coupling the signal path to and from the optical gain element, the first optical signal being transmitted through the photonic device in the first direction;
      a second signal amplification path connectable between the photonic device and the second input/output for optically coupling the signal path to and from the optical gain element, the second optical signal being transmitted through the photonic device in the second direction; and
   the path switching circuit being configured to selectively connect the first signal amplification path and the second signal amplification path into the signal path.

2. The device of claim 1, wherein the path switching circuit is configured to selectively connect the first signal amplification path into the signal path, such that:
   the first input/output is optically coupled to the optical gain element;
   the optical gain element is optically coupled to the photonic device; and
   the photonic device is optically coupled to the second input/output.

3. The device of claim 1, wherein the optical gain element is selectively configurable to optically amplify the first optical signal upstream of the photonic device in the first direction.

4. The device of claim 1, wherein the path switching circuit is configured to selectively connect the second signal amplification path into the signal path, such that:

the first input/output is optically coupled to the photonic device;

the photonic device is optically coupled to the optical gain element; and the optical gain element is optically coupled to the second input/output.

5. The device of claim 1, wherein the optical gain element is selectively configurable to optically amplify the second optical signal upstream of the photonic device in the second direction.

6. The device of claim 1, wherein the photonic device comprises a polarization-sensitive device and the signal path comprises a polarization-sensitive signal path.

7. The device of claim 1, wherein the photonic device comprises a plurality of signal paths, each signal path being connected to a respective path switching circuit and a respective optical gain element.

8. The device of claim 1, wherein the photonic device and the path switching circuit are monolithically integrated in a silicon photonics circuit.

9. The device of claim 1, wherein the optical gain element comprises a semiconductor optical amplifier, SOA.

10. The device of claim 9, wherein the SOA is hybrid integrated with a silicon photonics circuit.

11. A reconfigurable optical add/drop multiplexer, ROADM, comprising a device for processing an optical signal, the device comprising:

a photonic device arranged between a first input/output and a second input/output, the photonic device being in optical communication with the first and second inputs/outputs by a signal path, the signal path being selectively for transmission of a first optical signal in a first direction from the first input/output to the second input/output and for transmission of a second optical signal in a second direction from the second input/output to the first input/output;

an optical gain element for receiving the first or second optical signal and outputting an amplified first or second optical signal respectively, the optical gain element being selectively configurable to optically amplify the first optical signal downstream of the photonic device in the first direction and the second optical signal downstream of the photonic device in the second direction; and a path switching circuit comprising:

a first signal amplification path connectable between the first input/output and the photonic device for optically coupling the signal path to and from the optical gain element, the first optical signal being transmitted through the photonic device in the first direction;

a second signal amplification path connectable between the photonic device and the second input/output for optically coupling the signal path to and from the optical gain element, the second optical signal being transmitted through the photonic device in the second direction; and the path switching circuit being configured to selectively connect the first signal amplification path or the second signal amplification path into the signal path.

12. The ROADM of claim 11, the ROADM further comprising first and second polarization component add signal paths and first and second polarization component drop signal paths, each signal path being connected to a respective path switching circuit and a respective optical gain element.

13. The ROADM of claim 11, the ROADM further comprising first and second polarization component add signal paths and first and second polarization component drop signal paths, wherein the first and second polarization component add signal paths are connected to a first polarization-insensitive path switching circuit and a first polarization-insensitive optical gain element, and wherein the first and second polarization component drop signal paths are connected to a second polarization-insensitive path switching circuit and a second polarization-insensitive optical gain element.

14. A method for processing an optical signal, the method comprising:

receiving an optical signal at a first input/output or a second input/output;

transmitting the optical signal either from the first input/output in a first direction along a signal path to a photonic device and from the photonic device to the second input/output, or from the second input/output in a second direction along the signal path to the photonic device and from the photonic device to the first input/output;

amplifying the optical signal at an optical gain element by selectively directing the optical signal to either a first signal amplification path or a second signal amplification path, the first signal amplification path optically coupling the signal path between the first input/output and the photonic device to and from the optical gain element, and the second signal amplification path optically coupling the signal path between the photonic device and the second input/output to and from the optical gain element; and the optical gain element being selectively configurable to optically amplify the optical signal downstream of the photonic device in the first direction and another optical signal downstream of the photonic device in the second direction.

15. The method of claim 14, wherein directing the optical signal to the first signal amplification path comprises:

the first input/output being optically coupled to the optical gain element;

the optical gain element being optically coupled to the photonic device; and the photonic device being optically coupled to the second input/output.

16. The method of claim 14, further comprising optically amplifying the optical signal upstream of the photonic device in the first direction.

17. The method of claim 14, wherein directing the optical signal to the second signal amplification path comprises:

the first input/output being optically coupled to the photonic device;

the photonic device being optically coupled to the optical gain element; and the optical gain element being optically coupled to the second input/output.

18. The method of claim 14, wherein the photonic device is polarization-sensitive and the signal path comprises a polarization-sensitive signal path.

19. The method of claim 14, wherein the photonic device comprises a plurality of signal paths, the method further comprising providing a respective path switching circuit and a respective optical gain element for each signal path.

20. The method of claim 14, wherein the optical gain element is a polarization-insensitive optical gain element, and wherein the method further comprises converting a second spot-size of the optical gain element downstream of the polarization-insensitive optical gain element to a third spot-size of the signal path downstream of the optical gain element.

21. The method of claim 14, wherein the optical gain element comprises a semiconductor optical amplifier, SOA.

22. A method of operating a reconfigurable optical add/drop multiplexer, ROADM, the method comprising:
- receiving an optical signal at a first input/output or a second input/output;
- transmitting the optical signal either from the first input/output in a first direction along a signal path to a photonic device and from the photonic device to the second input/output, or from the second input/output in a second direction along the signal path to the photonic device and from the photonic device to the first input/output;
- amplifying the optical signal at an optical gain element by selectively directing the optical signal to either a first signal amplification path or a second signal amplification path, the first signal amplification path optically coupling the signal path between the first input/output and the photonic device to and from the optical gain element, and the second signal amplification path optically coupling the signal path between the photonic device and the second input/output to and from the optical gain element; and
- the optical gain element being selectively configurable to optically amplify the optical signal downstream of the photonic device in the first direction and another optical signal downstream of the photonic device in the second direction.

* * * * *